(12) United States Patent
Sugimura et al.

(10) Patent No.: US 7,784,156 B2
(45) Date of Patent: Aug. 31, 2010

(54) HINGE APPARATUS AND IMAGE DISPLAYING APPARATUS

(75) Inventors: Yukio Sugimura, Kanagawa-ken (JP); Hideki Momma, Kanagawa-ken (JP)

(73) Assignee: Victor Company of Japan, Limited, Yokohama-shi (JP)

(*) Notice: Subject to any disclaimer, the term of this patent is extended or adjusted under 35 U.S.C. 154(b) by 563 days.

(21) Appl. No.: 11/878,336

(22) Filed: Jul. 24, 2007

(65) Prior Publication Data
US 2008/0263824 A1    Oct. 30, 2008

(30) Foreign Application Priority Data
Jul. 24, 2006    (JP)    ............... P2006-201237
Jul. 24, 2006    (JP)    ............... P2006-201238

(51) Int. Cl.
*E05D 3/10*    (2006.01)
(52) U.S. Cl. ............... 16/367; 16/303; 16/330; 348/333.06; 248/923
(58) Field of Classification Search .............. 16/367, 16/319, 337, 374, 297, 303, 330, 371; 361/679.27; 455/575.3; 379/433.13; 248/923; 348/333.06, 348/E5.025
See application file for complete search history.

(56) References Cited
U.S. PATENT DOCUMENTS 5,739,859 A * 4/1998 Hattori et al. ............... 348/375
7,123,304 B2 * 10/2006 Lu et al. ............... 348/333.06
7,469,449 B2 * 12/2008 Hsu ............... 16/367
7,478,789 B2 * 1/2009 Yukawa et al. ............... 248/371
2004/0231105 A1 * 11/2004 Ahn ............... 16/367
2006/0005354 A1 * 1/2006 Nada et al. ............... 16/221
2006/0107492 A1 * 5/2006 Chang et al. ............... 16/367
2008/0034543 A1 * 2/2008 Hsu et al. ............... 16/346
2008/0068494 A1 * 3/2008 Kim ............... 348/374

FOREIGN PATENT DOCUMENTS

| JP | 10-311327 | 11/1998 |
| JP | 2000-240636 | 9/2000 |
| JP | 2001-272719 | 10/2001 |
| KR | 1019990047369 | 7/1999 |
| KR | 1020040076810 | 9/2004 |

* cited by examiner

*Primary Examiner*—William L. Miller
(74) *Attorney, Agent, or Firm*—The Nath Law Group; Jerald L. Meyer; Stanley N. Protigal

(57) ABSTRACT

A hinge apparatus comprises a rotation body and a fixed body. The rotation body includes a frame which has a side portion orthogonal to a rotation axis and having a first through hole and a cut portion, and a longer side portion having an extending portion and extending along the rotation axis. The extending portion is engaged with the cut portion and has a protruding portion protruding outwardly of the side portion. The fixed body includes: a bracket having first and second side portions, a superimposed portion extending from the second side portion to be overlapped with the first side portion, and an opening passing through the first side portion and the superimposed portion; and a stud inserted through the opening and rotatably securing the frame to the bracket. The protruding portion is contacted with the superimposed portion at a predetermined angle to regulate the rotation of the rotation body.

11 Claims, 14 Drawing Sheets

HINGE APPARATUS AND IMAGE DISPLAYING APPARATUS

BACKGROUND OF THE INVENTION

1. Field of the Invention

The present invention relates to a hinge apparatus and an image displaying apparatus, and more specifically to a hinge apparatus and an image displaying apparatus provided with a hinge structure for opening and closing an image displaying panel displaying an image.

2. Related Background of the Invention

An image displaying apparatus provided with a thin image displaying panel such as a liquid crystal display element is conventionally known. Specifically, as the image displaying apparatus, a video camera, a digital still camera, a mobile phone, a notebook computer, a portable DVD (Digital Versatile Disc) player or the like is known.

The image displaying apparatus is provided with an apparatus main body and an image displaying panel. Furthermore, some of these image displaying apparatuses each includes a hinge apparatus employed to couple the image displaying panel with the apparatus main body such that the image displaying panel can be opened or closed with respect to the apparatus main body. Normally, the hinge apparatus is constructed so as to keep a closed state in which the image displaying panel is in a close contact with the apparatus main body when the image displaying apparatus is not used, as well as so as to keep an opened state in which the image displaying panel stands about at 90° with respect to the apparatus main body when the image displaying apparatus is used.

In the case where the image displaying apparatus is a notebook computer or a portable DVD player, a hinge apparatus can be turned about one axis between the closed state and the opened state. In contrast, in the case where the image displaying apparatus is a video camera, a digital still camera or a mobile phone, the hinge apparatus can be turned about one axis between the closed state and the opened state, as well as can be turned about the other axis in the opened state. That is, the hinge apparatus is constructed such that the image displaying panel can be turned about a first axis and a second axis which intersect at right angles with each other.

In Japanese Patent Application Laid-Open No. 2001-272719, disclosed is a hinge apparatus provided with a substantially L-shaped hinge fixing member, a hinge rotating member, a pair of first rotary shaft members and a second rotary shaft member. In a state in which two arms of the hinge rotating member are overlapped with two arms of the hinge fixing member, the first rotary shaft members are coupled to connection portions provided at the overlapped arms, respectively. Thereby, the hinge rotating member can turn about a first rotation axis which passes through central portions of the first rotary shaft members. The second rotary shaft member is coupled to a central portion of the hinge rotating member. Thereby, the second rotary shaft member can turn about a second rotation axis which is orthogonal to the first rotation axis. This hinge apparatus needs not to be provided with a shaft core member extending axially.

In Japanese Patent Application Laid-Open No. 2000-240636, disclosed is a hinge apparatus provided with a pair of brackets, an opening/closing shaft and a rotary shaft. The opening/closing shaft is supported by the brackets at both end portions thereof. The rotary shaft rotatably passes through a central portion of the opening/closing shaft along a direction orthogonal to the opening/closing shaft. The opening/closing shaft and the rotary shaft respectively correspond to the first rotation axis and the second rotation axis which are disclosed in Japanese Patent Application Laid-Open No. 2001-272719.

In the image displaying apparatus, the first rotation axis in each of these hinge apparatuses is normally set to be a rotation axis for opening or closing an image displaying panel. Therefore, in respect of turning about the first rotation axis, the image displaying panel is required to be held in an arbitrary angular position. Furthermore, in respect of turning about the first rotation axis, it is required that a user can feel an appropriate and comfortable frictional feel and obtain a click feel at a specified angular position.

A hinge mechanism to meet the above-described requirements is disclosed in Japanese Patent Application Laid-Open No. H10 (1998)-311327. This hinge mechanism is provided with a shaft, a first cam, a second cam and a spring. The shaft extends along the first rotation axis. The first cam is operated together with the rotation of the shaft. The second cam is not operated together with the rotation of the shaft. The spring is inserted in the shaft to bias the second cam toward the first cam such that a cam face of the second cam is contacted with a cam face of the first cam. By this cam mechanism, the resistance against rotation can be obtained by a biasing force of the spring. Therefore, an image displaying panel is held at an arbitrary angular position and a click feel can be obtained at a specified angular position depending on a cam shape.

Meanwhile, an image displaying apparatus onto which the hinge apparatus as described above is mounted increasingly comes to be downsized and weight-saved accompanied with the enlargement of spread of mobile applications.

As the image displaying apparatus is downsized, the hinge apparatus is downsized and a plurality of members employed in the hinge apparatus are made thin for weight saving, which results in the tendency of decreased strength or rigidity. Normally, a predetermined rotation angle range in which an image displaying panel can be turned is set to the image displaying apparatus. Thus, in order to inhibit the image displaying panel from being turned over the predetermined rotation angle range, a stopper structure is provided at the hinge apparatus. However, due to thinning of the members employed in the hinge apparatus, the strength of the stopper structure tends to decrease.

Furthermore, even if, the members employed in the hinge apparatus are made thin, turning force to be applied to the image displaying panel by a user (force provided by hands) in order to position the image displaying panel in a desired posture, is not changed. Thus, when the image displaying panel is turned, force larger than the force to which the thinned stopper structure can be resistant is applied, which results in a higher possibility that the hinge apparatus is damaged.

In particular, in respect of turning about the first rotation axis, that is, opening or closing the image displaying panel, the image displaying panel is likely to bump on a wall or a desk in a state in which the image displaying panel is opened. When the image displaying panel is bumped on the wall or the desk, unintended force is forcibly applied to the stopper structure, which results in a high possibility that the hinge apparatus is damaged. Thus, even if the hinge apparatus is downsized, rotation-regulating strength of the stopper structure provided at the hinge apparatus is desired to keep high.

As described in Japanese Patent Application Laid-Open No. 2000-240636, a conventional rotation-regulating structure (stopper structure) is provided with an angle-regulating piece and an angle-regulating portion. The angle-regulating piece is formed at a bracket (opening/closing shaft support) by bending the bracket. The angle-regulating portion is provided at a plate preventing the opening/closing shaft from coming off, and extends outward from the periphery of the plate preventing the opening/closing shaft from coming off. By bringing the angle-regulating portion in contact with the angle-regulating piece of the bracket, an angle regulation of the opening/closing shaft is conducted.

In this rotation-regulating structure, the bracket is merely bent to form the angle-regulating piece. Thus, when strong force is applied to the angle-regulating piece, the angle-regulating piece is deformed to make it impossible to conduct a rotation regulation at a predetermined position and there is a possibility that a hinge apparatus is damaged.

The hinge apparatus described in Japanese Patent Application Laid-Open No. 2001-272719 is provided with a thin annular friction spring and a small hole, in order to hold an image displaying panel at an arbitrary angular position and obtain a click feel in a specified angular position. The friction spring is coupled to a connection portion provided at one arm of the hinge fixing member. The friction spring is engaged with the small hole to provide a click feel to a user. However, since the friction spring is formed to be annular, a sufficient stroke in a rotation axis direction cannot be obtained in an elastic deformation of the friction spring. Therefore, a problem exists in that frictional force is fluctuated or that a frictional touch of a high quality is hard to obtain. In addition, a further problem exists in that a click feel is hard to exhibit with a subtle frictional touch and that rotation operation of high quality is hard to obtain.

The hinge apparatus described in Japanese Patent Application Laid-Open No. 2000-240636 is provided with the pair of opening/closing shaft supports (brackets), a wavy spring and an opening/closing click plate, in order to hold an image displaying panel at an arbitrary angular position and obtain a click feel in a specified angular position. The opening/closing shaft supports are respectively provided at both ends of the opening/closing shaft to support the opening/closing shaft. The wavy spring is provided at one of the opening/closing shaft supports. The opening/closing click plate includes a spherical concavity to be engaged with a spherical protrusion formed at the wavy spring. However, since the wavy spring is formed in a thin annular shape, an elastic deformation region is narrow and, in the elastic deformation of the wavy spring, a sufficient stroke in a rotation axis direction cannot be obtained. Therefore, a problem exists in that frictional forces are fluctuated or that a frictional touch of high quality is hard to obtain. Furthermore, a further problem exists in that a click feel is hard to exhibit with a subtle frictional touch and that rotation operation of high quality is hard to obtain.

In a hinge mechanism described in Japanese Patent Application Laid-Open No. H10 (1998)-311327, since the cam faces of the first and the second cams can be set without restraint in a rotation axis direction and in an elastic deformation of the spring for biasing the second cam toward the first cam, a stroke in the rotation axis direction can be set to be large. Thus, a frictional force is stable and a frictional touch of high quality can be obtained. However, this hinge mechanism is provided with the shaft extending on the rotation axis and provided with the first cam, the second cam and the spring to be inserted in the shaft. Here, it is noted that the first cam and the second came are large in outer diameter. Therefore, if this hinge mechanism includes a mechanism of the rotation with a second rotation axis orthogonal to the first rotation axis, a problem exists in a larger hinge mechanism.

SUMMARY OF THE INVENTION

A first object of the present invention is to provide a hinge apparatus having extremely high rotation-regulating strength of a stopper regulating a rotation angle.

A second object of the present invention is to provide an image displaying apparatus having extremely high rotation-regulating strength of a stopper regulating a rotation angle when an image displaying panel is opened and closed with respect to a main body portion (apparatus main body).

A third object of the present invention is to provide a hinge apparatus capable of being downsized in which a rotation member can be held with stability at an arbitrary angular position, a frictional touch of high quality can be obtained in rotation operation, and a click feel of high quality can be obtained at a specified angular position in the rotation operation.

A fourth object of the present invention is to provide an image displaying apparatus capable of being downsized in which an image displaying panel can be held with stability at an arbitrary angular position, a frictional touch of high quality can be obtained in rotation operation, and a click feel of high quality can be obtained at a specified angular position in the rotation operation.

To achieve the above-described objects, the applied present invention first provides the following (A) to (K):

(A) A hinge apparatus (50) comprising: a rotation body (50B); and a fixed body (50A) configured to support the rotation body (50B) rotatably about a rotation axis (X), wherein the rotation body (50B) includes: a base frame (2) having: a base body portion (2b) extending along the rotation axis (X); and a side portion (2cA) extending from an end of the base body portion (2b) in a direction orthogonal to the rotation axis (X) and formed with a first through hole (2c1) with the rotation axis (X) as a central axis, wherein the fixed body (50A) includes: a bracket (1A) having: a base portion (1Aa); a first side portion (1Ab) extending from a first edge of the base portion (1Aa); a second side portion (1Ac) extending from a second edge of the base portion (1Aa); a superimposed portion (1Ad) extending from the second side portion (1Ac) so as to be overlapped with the first side portion (1Ab); a second through hole (1Ae) passing through the first side portion (1Ab); and a third through hole (1Af) passing through the superimposed portion (1Ad) and communicating with the second through hole (1Ae); and a stud (7) inserted through the first through hole (2c1), the second through hole (1Ae) and the third through hole (1Af), and secured to the bracket (1A) so as to rotatably support the base frame (2) with respect to the bracket (1A), and wherein the base frame (2) has a contact portion (2a6) to be in contact with at least one of the first side portion (1Ab), the superimposed portion (1Ad) and the stud (7) in a predetermined angular position with respect to the bracket (1A), and by the contact, the rotation body (50B) is regulated from rotating with respect to the fixed body (50A);

(B) A hinge apparatus (50) comprising: a rotation body (50B); and a fixed body (50A) configured to support the rotation body (50B) rotatably about a rotation axis (X), wherein the rotation body (50B) includes a base frame (2) having: a base body portion (2b) extending along the rotation axis (X); a side portion (2cA) extending from an end of the base body portion (2b) in a direction orthogonal to the rotation axis (X) and having a first through hole (2c1) with the rotation axis (X) as a central axis and a cut portion (2c2) formed by cutting an outer edge of the side portion (2cA); and a longer side portion (2*a*) having an extending portion (2*a*6) and extending from an end of the base body portion (2*b*) outwardly of the base body portion (2*b*) along the rotation axis (X), the extending portion (2*a*6) is engaged with the cut portion (2*c*2) and has a protruding portion (2*a*6*t*) protruding outward beyond an outer surface of the side portion (2*c*) on a tip end side of the extending portion (2*a*6), wherein the fixed body (50A) includes: a bracket (1A) having a second through hole (1Ae); and a stud (7) inserted through the first through hole (2*c*1) and the second through hole (1Ae) and secured to the bracket (1A) so as to rotatably support the base frame (2) with respect to the bracket (1A), and wherein the protruding portion (2*a*6*t*) of the base frame (2) is in contact with at least one of the bracket (1A) and the stud (7) in a predetermined angular position with respect to the bracket (1A), and thereby the rotation body (50B) is regulated from rotating with respect to the fixed body (50A);

(C) A hinge apparatus (50) comprising: a rotation body (50B); and a fixed body (50A) configured to support the rotation body (50B) rotatably about a rotation axis (X), wherein the rotation body (50B) includes a base frame (2) having: a base body portion (2*b*) extending along the rotation axis (X); a side portion (2*c*) extending from an end of the base body portion (2*b*) in a direction orthogonal to the rotation axis (X) and having a first through hole (2*c*1) with the rotation axis (X) as a central axis and a cut portion (2*c*2) formed by cutting an outer edge of the side portion (2*c*); and a longer side portion (2*a*) having an extending portion (2*a*6) and extending from an end of the base body portion (2*b*) outwardly of the base body portion (2*b*) along the rotation axis (X), the extending portion (2*a*6) is engaged with the cut portion (2*c*2) and has a protruding portion (2*a*6*t*) protruding outward beyond an outer surface of the side portion (2*c*) on a tip end side of the extending portion (2*a*6), wherein the fixed body (50A) includes: a bracket (1A) having: a base portion (1Aa); a first side portion (1Ab) extending from a first edge of the base portion (1Aa); a second side portion (1Ac) extending from a second edge of the base portion (1Aa); a superimposed portion (1Ad) extending from the second side portion (1Ac) so as to be overlapped with the first side portion (1Ab); a second through hole (1Ae) passing through the first side portion (1Ab); and a third through hole (1Af) passing through the superimposed portion (1Ad) and communicating with the second through hole (1Ae); and a stud (7) inserted through the first through hole (2*c*1), the second through hole (1Ae) and the third through hole (1Af), and secured to the bracket (1A) so as to rotatably support the base frame (2) with respect to the bracket (1A), and wherein the protruding portion (2*a*6*t*) of the base frame (2) is in contact with at least one of the first side portion (1Ab), the superimposed portion (1Ad) and the stud (7) in a predetermined angular position with respect to the bracket (1A), and thereby the rotation body (50B) is regulated from rotating with respect to the fixed body (50A);

(D) An image displaying apparatus (150) comprising: a main body portion (151); an image displaying portion (152) configured to display an image; and a hinge apparatus (50) configured to cause the image displaying portion (152) to turn about at least one axis with respect to the main body portion (151), wherein the hinge apparatus (50) comprises: a rotation body (50B); and a fixed body (50A) configured to support the rotation body (50B) rotatably about a rotation axis (X), the rotation body (50B) including: a base frame (2) having a base body portion (2*b*) extending along the rotation axis (X); and a side portion (2*c*A) extending from an end of the base body portion (2*b*) in a direction orthogonal to the rotation axis (X) and formed with a first through hole (2*c*1) with the rotation axis (X) as a central axis, and the fixed body (50A) including: a bracket (1A) having: a base portion (1Aa); a first side portion (1Ab) extending from a first edge of the base portion (1A); a second side portion (1Ac) extending from a second edge of the base portion (1Aa); a superimposed portion (1Ad) extending from the second side portion (1Ac) so as to be overlapped with the first side portion (1Ab); a second through hole (1Ae) passing through the first side portion (1Ab); and a third through hole (1Af) passing through the superimposed portion (1Ad) and communicating with the second through hole (1Ae); and a stud (7) inserted through the first through hole (2*c*1), the second through hole (1Ae) and the third through hole (1Af), and secured to the bracket (1A) so as to rotatably support the base frame (2) with respect to the bracket (1A), and wherein the base frame (2) includes a contact portion (2*a*6) to be in contact with at least one of the first side portion (1Ab), the superimposed portion (1Ad) and the stud (7) in a predetermined angular position with respect to the bracket (1A), by the contact, the rotation body (50B) is regulated from rotating with respect to the fixed body (50A), the fixed body (50A) is coupled to the main body portion (151), and the rotation body (50B) is coupled to the image displaying portion (152);

(E) An image displaying apparatus (150) comprising: a main body portion (151); an image displaying portion (152) configured to display an image; and a hinge apparatus (50) configured to cause the image displaying portion (152) to turn about at least one axis with respect to the main body portion (151), wherein the hinge apparatus (50) comprises: a rotation body (50B); and a fixed body (50A) configured to support the rotation body (50B) rotatably about a rotation axis (X); the rotation body (50B) including a base frame (2) having: a base body portion (2*b*) extending along the rotation axis (X); a side portion (2*c*A) extending from an end of the base body portion (2*b*) in a direction orthogonal to the rotation axis (X) and having: a first through hole (2*c*1) with the rotation axis (X) as a central axis; and a cut portion (2*c*2) formed by cutting an outer edge of the side portion (2*c*A); and a longer side portion (2*a*) having an extending portion (2*a*6) and extending from an end of the base body portion (2*b*) outwardly of the base body portion (2*b*) along the rotation axis (X), the extending portion (2*a*6) is engaged with the cut portion (2*c*2) and has a protruding portion (2*a*6*t*) protruding outward beyond the outer surface of the side portion (2*c*) on a tip end side of the extending portion (2*a*6), and the fixed body (50A) including: a bracket (1A) having a second through hole (1Ae); and a stud (7) inserted through the first through hole (2*c*1) and the second through hole (1Ae) and secured to the bracket (1A) so as to rotatably support the base frame (2) with respect to the bracket (1A), and wherein the protruding portion (2*a*6*t*) of the base frame (2) is in contact with at least one of the bracket (1A) and the stud (7) in a predetermined angular position with respect to the bracket (1A), and thereby the rotation body (50B) is regulated from rotating with respect to the fixed body (50A), the fixed body (50A) is coupled to the main body portion (151), and the rotation body (50B) is coupled to the image displaying portion (152);

(F) An image displaying apparatus (150) comprising: a main body portion (151); an image displaying portion (152) configured to display an image; and a hinge apparatus (50) configured to cause the image displaying portion (152) to turn about at least one axis with respect to the main body portion (151), wherein the hinge apparatus (50) comprises: a rotation body (50B); and a fixed body (50A) configured to support the rotation body (50B) rotatably about a rotation axis (X), the rotation body (50B) including a base frame (2) having: a base body portion (2*b*) extending along the rotation axis (X); a side portion (2*c*) extending from an end of the base body portion (2b) in a direction orthogonal to the rotation axis (X) and having: a first through hole (2c1) with the rotation axis (X) as a central axis; and a cut portion (2c2) formed by cutting an outer edge of the side portion (2c); and a longer side portion (2a) having an extending portion (2a6) and extending from an end of the base body portion (2b) outwardly of the base body portion (2b) along the rotation axis (X), the extending portion (2a6) is engaged with the cut portion (2c2) and has a protruding portion (2a6t) protruding outward beyond the outer surface of the side portion (2c) on a tip end side of the extending portion (2a6), and the fixed body (50A) including: a bracket (1A) having: a base portion (1Aa); a first side portion (1Ab) extending from a first edge of the base portion (1Aa); a second side portion (1Ac) extending from a second edge of the base portion (1Aa); a superimposed portion (1Ad) extending from the second side portion (1Ac) so as to be overlapped with the first side portion (1Ab); a second through hole (1Ae) passing through the first side portion (1Ab); and a third through hole (1Af) passing through the superimposed portion (1Ad) and communicating with the second through hole (1Ae); and a stud (7) inserted through the first through hole (2c1), the second through hole (1Ae) and the third through hole (1Af) and secured to the bracket (1A) so as to rotatably support the base frame (2) with respect to the bracket (1A), and wherein the protruding portion (2a6t) of the base frame (2) is in contact with at least one of the first side portion (1Ab), the superimposed portion (1Ad) and the stud (7) in a predetermined angular position with respect to the bracket (1A), and thereby the rotation body (50B) is regulated from rotating with respect to the fixed body (50A); the fixed body (50A) is coupled to the main body portion (151); and the rotation body (50B) is coupled to the image displaying portion (152);

(G) A hinge apparatus (50) comprising: a rotation body (50B); and a fixed body (50A) configured to support the rotation body (50B) rotatably about one rotation axis (X), wherein the rotation body (50B) includes: a base frame (2) having: a base body portion (2b) extending along the one rotation axis (X); a first side portion (2cA) extending from a first end of the base body portion (2b) in a direction orthogonal to the one rotation axis (X) and formed with a first through hole (2c1) with the one rotation axis (X) as a central axis; and a second side portion (2cB) extending from a second end of the base body portion (2b) in a direction orthogonal to the one rotation axis (X) and formed with a second through hole (2c1) with the one rotation axis (X) as a center axis; a first cam body (5) formed with a first cam face (5M) at one end thereof, suppresses by the base body portion (2b) the rotation about the one rotation axis (X) with respect to the base body portion (2b), and supported by the base body portion (2b) so as to be movable in a direction of the one rotation axis (X); and a biasing body (12) disposed between the first cam body (5) and the second side portion (2cB) and biasing the first cam body (5) toward the first side portion (2cA), wherein the fixed body (50A) includes: a first shaft (7) inserted in the first through hole (2c1) of the first side portion (2cA) and supporting the base frame (2) rotatably about the one rotation axis (X); a second shaft (8) inserted in the second through hole (2c1) of the second side portion (2CB) and supporting the base frame (2) rotatably about the one rotation axis (X); and a second cam body (6) formed with a second cam face (6M) at one end thereof and supported by the first shaft (7) between the first cam body (5) and the first side portion (2cA) so that the rotation about the one rotation axis (X) with respect to the first shaft (7) is suppressed, and wherein the first cam face (5M) and the second cam face (6M) are pressed and contacted with each other by a bias of the biasing body (12);

(H) The hinge apparatus according to (G), wherein a distance (Ls) between tip ends of the first shaft (7) and the second shaft (8) is longer than that of the first cam body (5) in a direction of the one rotation axis (X);

(I) The hinge apparatus according to (G), wherein the base body portion (2b) of the base frame (2) includes: a third through hole (2b1) with the other rotation axis (Y) orthogonal to a plane containing the one rotation axis (X) as a central axis; a third shaft (9) inserted from the outside in the third through hole (2b1); a shaft fixing portion (11) fixed to a tip end of the third shaft (9) having been inserted, sandwiching the base body portion (2b) between the shaft fixing portion (11) and the third shaft (9), and rotating about the other rotation axis (Y) with respect to the base frame (2); and a concave portion (5g) provided at the side portion of the first cam body (5), and wherein the shaft fixing portion (11) comes in the concave portion (5g).

(J) An image displaying apparatus (150) comprising: a main body portion (151); an image displaying portion (152) configured to display an image; and a hinge apparatus (50) configured to cause the image displaying portion (152) to turn about at least one axis with respect to the main body portion (151), wherein the hinge apparatus (50) comprises: a rotation body (50B); and a fixed body (50A) configured to support the rotation body (50B) rotatably about one rotation axis (X), the rotation body (50B) including: a base frame (2) having: a base body portion (2b) extending along the one rotation axis (X); a first side portion (2cA) extending from a first end of the base body portion (2b) in a direction orthogonal to the one rotation axis (X) and formed with a first through hole (2c1) with the one rotation axis (X) as a central axis; and a second side portion (2cB) extending from a second end of the base body portion (2b) in a direction orthogonal to the one rotation axis (X) and formed with a second through hole (2c1) with the one rotation axis (X) as a center axis; a first cam body (5) formed with a first cam face (5M) at one end of the first cam body (5), suppresses by the base body portion (2b) the rotation about the one rotation axis (X) with respect to the base body portion (2b), and supported by the base body portion (2b) so as to be movable in a direction of the one rotation axis (X); and a biasing body (12) disposed between the first cam body (5) and the second side portion (2cB) and biasing the first cam body (5) toward the first side portion (2cA); and the fixed body (50A) including: a first shaft (7) inserted in the first through hole (2c1) of the first side portion (2cA) and supporting the base frame (2) rotatably about the one rotation axis (X); a second shaft (8) inserted in the second through hole (2c1) of the second side portion (2cB) and supporting the base frame (2) rotatably about the one rotation axis (X); and a second cam body (6) formed with a second cam face (6M) at one end of the second cam body (6) and supported by the first shaft (7) between the first cam body (5) and the first side portion (2cA) so that the rotation about the one rotation axis (X) with respect to the first shaft (7) is suppressed, and wherein the first cam face (5M) and the second cam face (6M) are pressed and contacted with each other by a bias of the biasing body (12), the fixed body (50A) is coupled to the main body portion (151), and the rotation body (50B) is coupled to the image displaying portion (152);

(K) An image displaying apparatus (150) comprising: a main body portion (151); an image displaying portion (152) configured to display an image; and a hinge apparatus (50) configured to cause the image displaying portion (152) to turn about at least one axis with respect to the main body portion (151), wherein the hinge apparatus (50) comprises: a rotation body (50B); and a fixed body (50A) configured to support the rotation body (50B) rotatably about one rotation axis (X), the rotation body (50B) including: a base frame (2) having: a base body portion (2b) extending along the one rotation axis (X); a first side portion (2cA) extending from a first end of the base body portion (2b) in a direction orthogonal to the one rotation axis (X) and formed with a first through hole (2c1) with the one rotation axis (X) as a central axis; and a second side portion (2cB) extending form a second end of the base body portion (2b) in a direction orthogonal to the one rotation axis (X) and formed with a second through hole (2c1) with the one rotation axis (X) as a center axis; a first cam body (5) formed with a first cam face (5M) at one end of the first cam body, suppresses by the base body portion (2b) the rotation about the one rotation axis (X) with respect to the base body portion (2b), and supported by the base body portion (2b) so as to be movable in a direction of the one rotation axis (X); and a biasing body (12) disposed between the first cam body (5) and the second side portion (2cB) and biasing the first cam body (5) toward the first side portion (2cA), and the fixed body (50A) including: a first shaft (7) inserted in the first through hole (2c1) of the first side portion (2cA) and supporting the base frame (2) rotatably about the one rotation axis (X); a second shaft (8) inserted in the second through hole (2c1) of the second side portion (2cB) and supporting the base frame (2) rotatably about the one rotation axis (X); and a second cam body (6) formed with a second cam face (6M) at one end of the second cam body (6), and supported by the first shaft (7) between the first cam body (5) and the first side portion (2cA) so that the rotation about the one rotation axis (X) with respect to the first shaft (7) is suppressed, and the first cam face (5M) and the second cam face (6M) are pressed and contacted with each other by a bias of the biasing body (12), wherein the base body portion (2b) of the base frame (2) includes: a third through hole (2b1) with the other rotation axis (Y) orthogonal to a plane containing the one rotation axis (X) as a central axis; a third shaft (9) inserted from the outside in the third through hole (2b1); a shaft fixing portion (11) fixed to a tip end of the third shaft (9) having been inserted, sandwiching the base body portion (2b) between the shaft fixing portion (11) and the third shaft (9), and rotating about the other rotation axis (Y) with respect to the base frame (2); and a concave portion (5g) provided at the side portion of the first cam body (5), and wherein the shaft fixing portion (11) comes in the concave portion (5g), the fixed body (50A) is coupled to the main body portion (151), and the third shaft (9) is coupled to the image displaying portion (152).

According to the present invention, there can be provided a hinge apparatus having extremely high rotation-regulating strength of a stopper regulating a rotation angle.

According to the present invention, there can be provided an image displaying apparatus having extremely high rotation-regulating strength of a stopper regulating a rotation angle when an image displaying panel is opened and closed with respect to a main body portion (apparatus main body).

According to the present invention, there can be provided a hinge apparatus capable of being downsized in which a rotation member can be held with stability at an arbitrary angular position, a frictional touch of high quality can be obtained in rotation operation, and a click feel of high quality can be obtained at a specified angular position in the rotation operation.

According to the present invention, there can be provided an image displaying apparatus capable of being downsized in which an image displaying panel can be held with stability at an arbitrary angular position, a frictional touch of high quality can be obtained in rotation operation, and a click feel of high quality can be obtained at a specified angular position in the rotation operation.

DESCRIPTION OF THE PREFERRED EMBODIMENTS

With reference to FIGS. 1 to 14, a hinge apparatus and an image displaying apparatus according to an embodiment of the present invention will be described in detail hereinafter. In this embodiment, as the hinge apparatus and the image displaying apparatus, a hinge apparatus 50 and a video camera 150 are thought.

Figure 1:
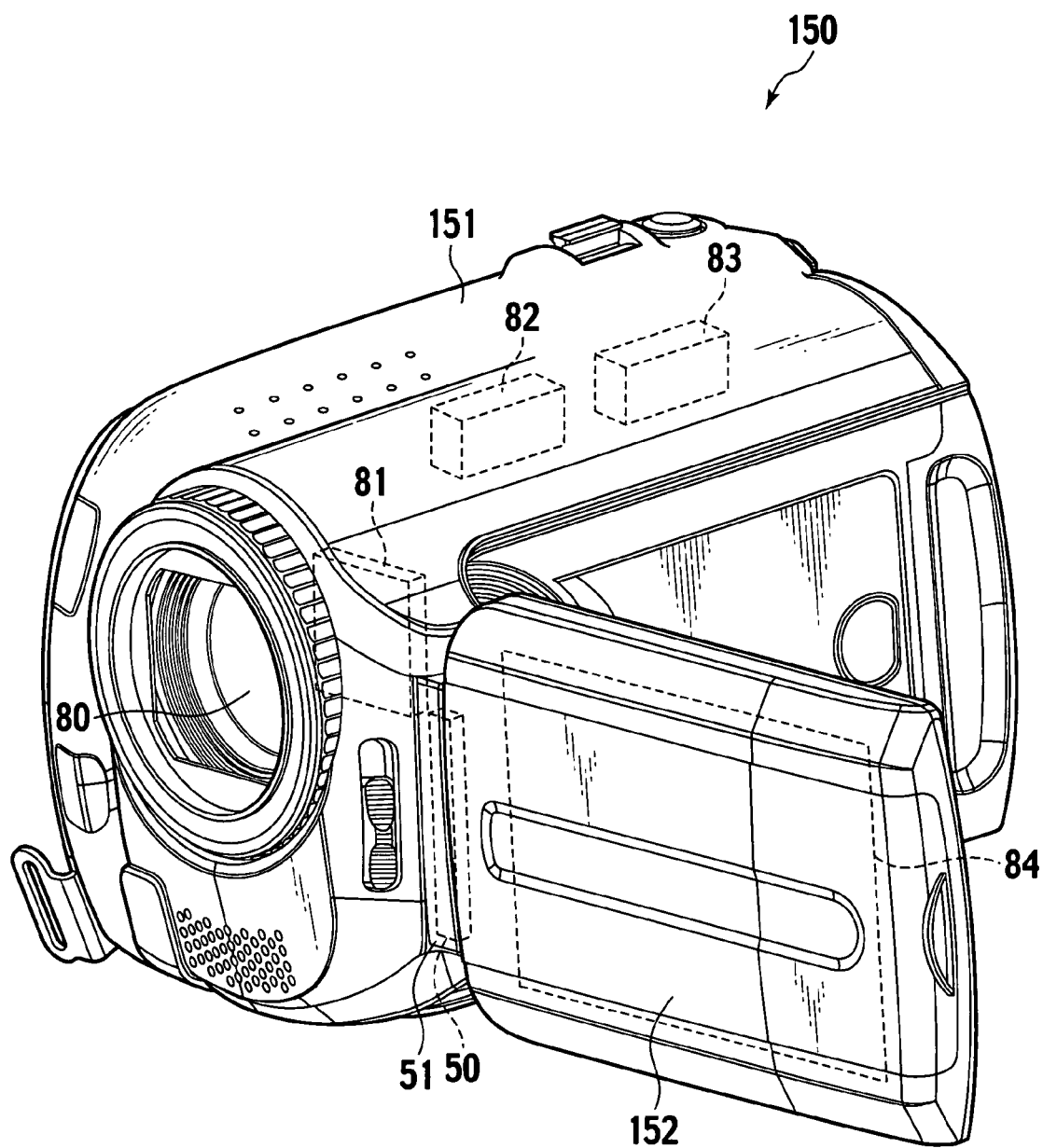
FIG. 1 is an external perspective view of an image displaying apparatus according to an embodiment of the present invention.
Figure 2:
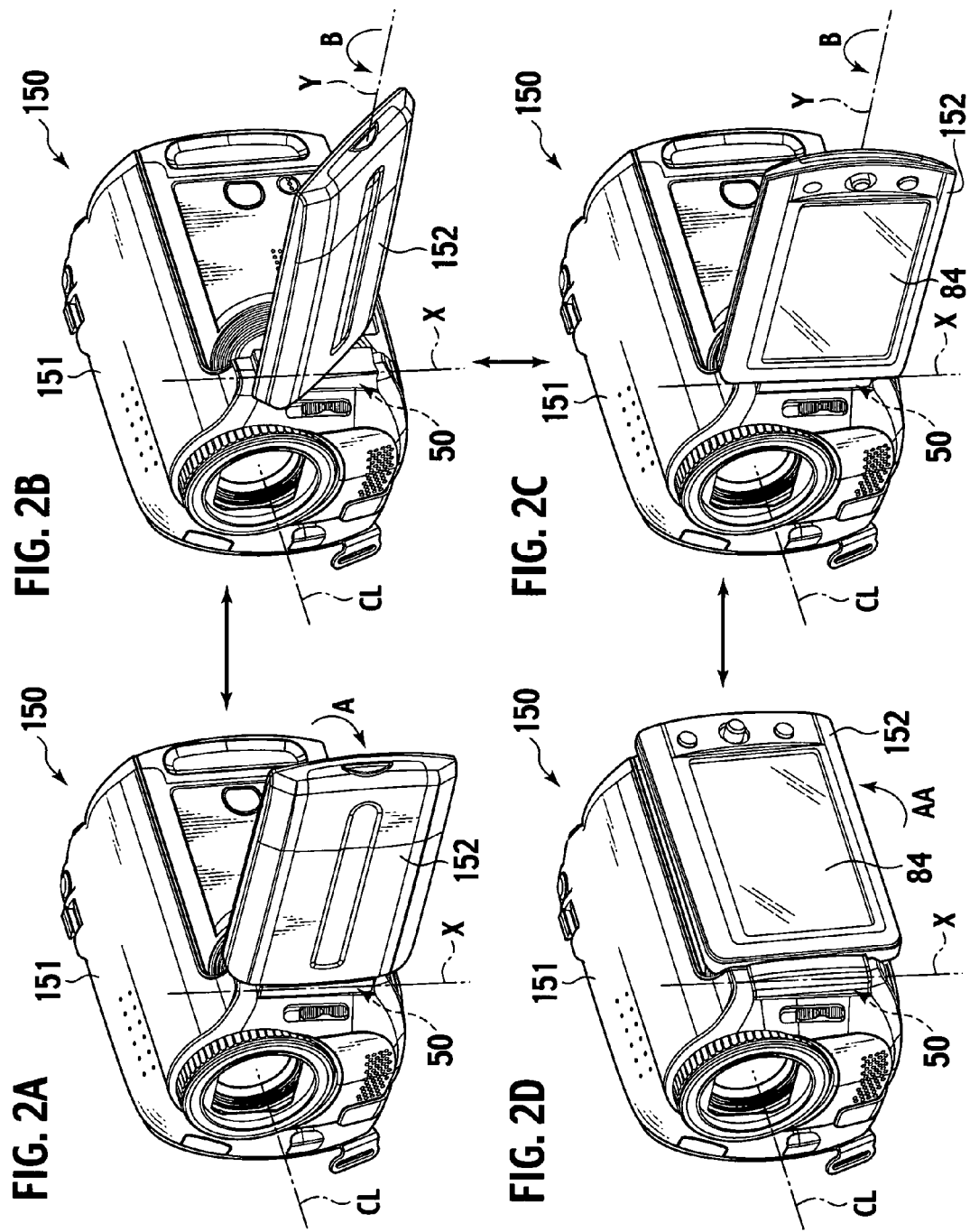
FIGS. 2A to 2D are explanatory views for use in illustrating rotation forms of an image displaying panel in the image displaying apparatus according to the embodiment of the present invention.

As shown in FIG. 1, the video camera 150 includes the hinge apparatus 50, a main body portion 151 and an image displaying panel 152. The hinge apparatus 50 opens and closes the image displaying panel 152 with respect to the main body portion 151. FIG. 1 shows a state in which the image displaying panel 152 is opened approximately 90° with respect to the main body portion 151.

A connection portion between the main body portion 151 and the image displaying panel 152 is apparently covered with a hinge cover 51. The hinge apparatus 50 is contained in an internal part of the hinge cover 51.

On the front side of, the main body portion 151, a lens portion 80 is provided. There are provided in an internal part of the main body portion 151 an imaging element 81, a signal processing circuit 82 and a recording and reproducing portion 83. The imaging element 81 converts an image of a subject that is obtained via the lens portion 80 into an electrical signal. The signal processing circuit 82 processes the electrical signal from the imaging element 81. The recording and reproducing portion 83 records an image signal output from the signal processing circuit 82 and reproduces the recorded image signal.

Here, an image includes a still image and a moving image. In addition, as a recording medium, a magnetic tape, an optical disk, a magneto-optical disk, a solid-state memory or the like is employed. Furthermore, the recording medium may be the one contained in the video camera 150, or the one removable. In addition, the recording medium may be externally located. At this time, the video camera 150 includes a communication unit for an external communication, and receives/transmits signals from/to the recording medium via the communication unit. An image of the subject, a reproduced image from the recording and reproducing portion 83, an operation image for operating the video camera 50 or the like is displayed on an image displaying portion 84 provided on the image displaying panel 152.

The image displaying panel 152, by the hinge apparatus 50, can obtain rotation forms as shown in FIGS. 2A to 2D.

A position in which the image displaying portion 84 of the image displaying panel 152 is held on the side of the main body portion 151 is to be a basic position. FIG. 2A shows a first rotation position in which the image displaying panel 152 is turned approximately 90° (refer to an arrow A) about X-axis orthogonal to a face including an optical axis CL from the basic position (hereinafter, the X-axis is also referred to as a first rotation axis). FIG. 2C shows a second rotation position in which the image displaying panel 152 is turned 180° (refer to an arrow B) about Y-axis orthogonal to the X-axis from the first rotation position (hereinafter, the Y-axis is also referred to as a second rotation axis). FIG. 2B shows an intermediate position between the first rotation position and the second rotation position. FIG. 2D shows a third rotation position in which the image displaying panel 152 is turned approximately 90° about the X-axis (refer to an arrow AA) from the second rotation position.

The first rotation position is a form to be preferably utilized when a user visually recognizes a screen (image displaying portion) 84 in a normal photographing. The second rotation position is a form to be preferably utilized when a photographed person, who is a subject, visually recognizes the screen 84 in self-photographing. The third rotation position is a form to be preferably utilized when mainly the user visually recognizes a reproduced image.

The hinge apparatus 50 can be turned independently about two rotation axes of the X-axis and the Y-axis orthogonal to a plane laid at right angles to the X-axis. Incidentally, the Y-axis is not limited to an axis crossing the X-axis. The Y-axis may be an axis orthogonal to the plane including the X-axis. Furthermore, although in this embodiment, a rotation angle about the X-axis from the basic position to the first rotation position is regulated to be 90°, and a rotation angle about the Y-axis from the first rotation position to the second rotation position is regulated to be 180°, the rotation angles about the X-axis and the Y-axis are not limited to these values.

Figure 3:
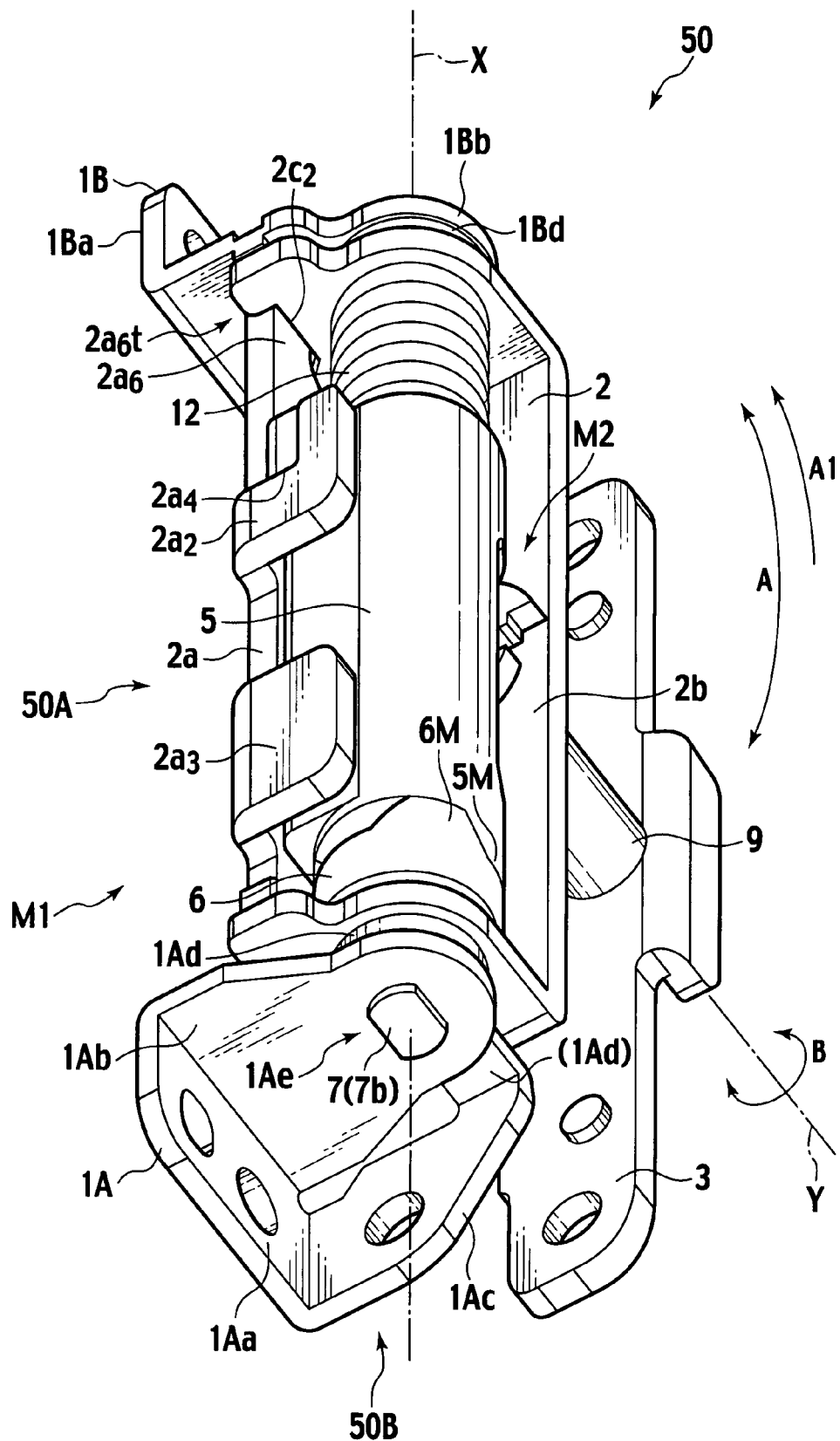
FIG. 3 is an external perspective view of a hinge apparatus according to the embodiment of the present invention.
Figure 4:
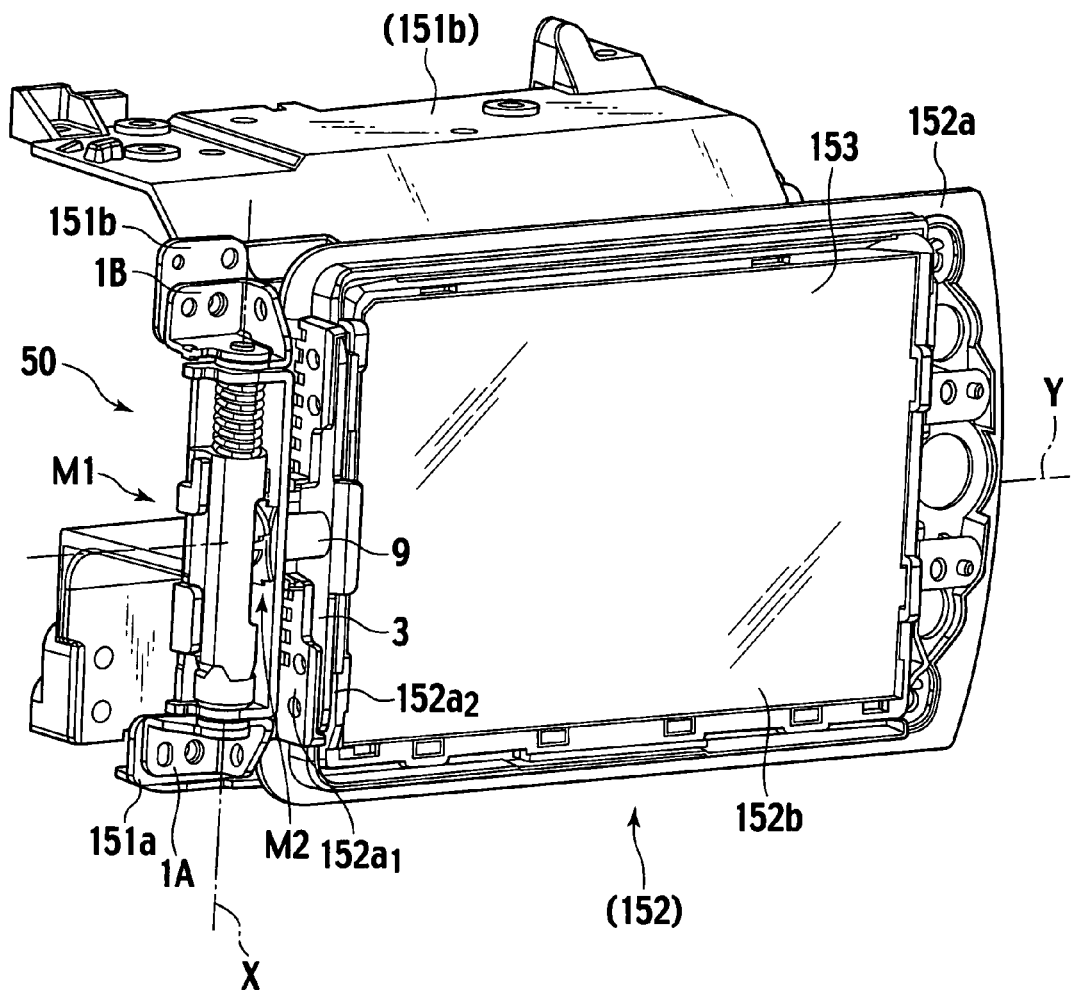
FIG. 4 is an explanatory view for use in illustrating a structure in which the hinge apparatus according to the embodiment of the present invention is attached to the image displaying apparatus.

The hinge apparatus 50 is constructed as an assembly unit as shown in FIG. 3 and attached to the video camera 150 as shown in FIG. 4. FIG. 4, in a form of the basic position in which the image displaying panel 152 is closed from the first rotation position shown in FIG. 2A, is a view showing members directly coupled to the hinge apparatus 50 with a removed face panel of the image displaying panel 152 and a removed face panel of the main body portion 151.

The structure of the hinge apparatus 50 will be described with reference to FIG. 3.

The hinge apparatus 50 is coupled to a first opposite member by securing a first bracket 1A and a second bracket 1B disposed on the X-axis with respect to the first opposite member to which the hinge apparatus 50 is fixed. With the first and the second brackets 1A and 1B, a base frame 2 is rotatably supported about the X-axis. The base frame 2 includes a pair of bent portions to be formed in a substantially U shape.

At the central portion of the base frame 2, a third stud 9 is rotatably supported about the Y-axis coaxial with the axis of the third stud 9. The third stud 9 is fixed to a sub frame 3. The base frame 2 can be rotated in a range of a predetermined angle about the X-axis, with respect to the first and second brackets 1A and 1B. The base frame 2, in the rotation of the base frame 2, includes a cam mechanism M1 exhibiting a predetermined frictional force and providing a click feel at a specified angle.

The sub frame 3 can be rotated in a range of a predetermined angle about the Y-axis, with respect to the base frame 2. The sub frame 3, in the rotation of the sub frame 3, includes a rotation regulating mechanism M2 exhibiting a predetermined frictional force and providing a click feel at a specified angle. The cam mechanism M1 and the rotation regulating mechanism M2 will be described below in detail.

As shown in FIG. 4, the hinge apparatus 50 is attached integrally with the main body portion 151 by securing the first bracket 1A to a first chassis 151a of the main body portion 151 with a screw (not shown) and by securing the second bracket 1B to a second chassis 151b of the main body portion 151 with a screw (not shown).

The sub frame 3 is engaged without looseness with an engaging portion 152a2 formed of a rib 152a1 provided at a frame 152a of the image displaying panel 152, and secured with the rib 152a1 using a screw (not shown) to be attached integrally with the image displaying panel 152. FIG. 4 shows a state in which a face panel of the image displaying panel 152 is removed as described above, and shows a light unit 152b which the image displaying portion (liquid crystal display element) 84 contained in the image displaying panel 152 includes, in the frame 152a.

Owing to such a structure, the hinge apparatus 50 is attached to the video camera 150 to enable the image displaying panel 152 to be opened and closed with respect to the main body portion 151.

Next, a detailed structure of the hinge apparatus 50 will be described with reference to FIGS. 3, 5 to 14. First, each component of the first and the second brackets 1A and 1B and the like will be described.

Figure 6:
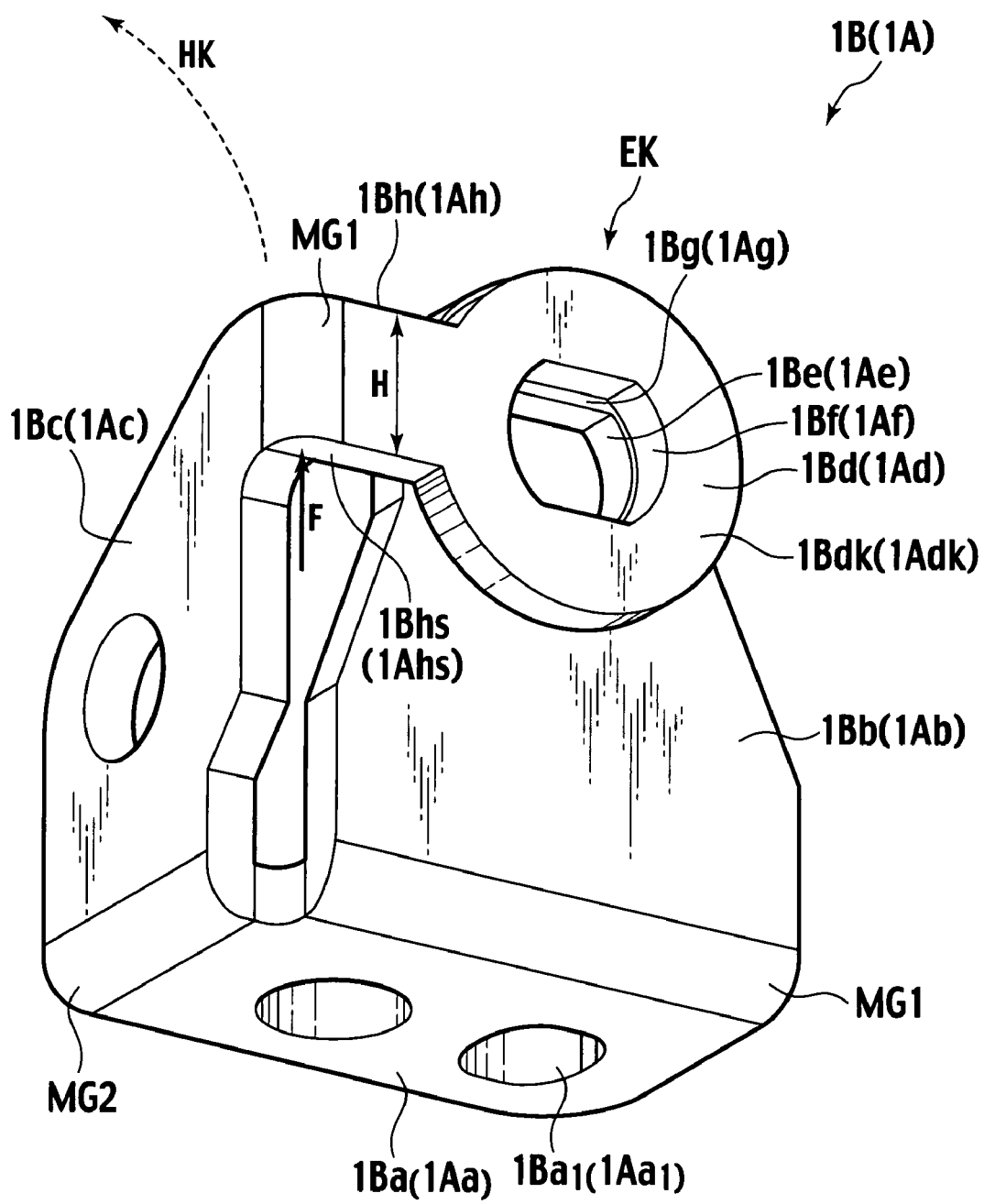
FIG. 6 is a perspective view of a first principal portion of the hinge apparatus according to the embodiment of the present invention.

The first and the second brackets 1A and 1B substantially possess symmetry with respect to a plane, so that only the second bracket 1B is described referring to FIG. 6. Incidentally, in the following description, the second bracket 1B is referred to as a bracket. In FIG. 6, reference numerals of components of the first bracket 1A are shown in brackets for the reason of convenience.

The bracket 1B is formed by pressing or bending a metal plate. Examples of metals that can be used include a stainless material or SPCC material of a thickness of 0.8 mm. In the case of the SPCC material, a surface thereof may be nitrided for a modification.

The bracket 1B includes a bottom portion 1Ba, side portions 1Bb, 1Bc, and a superimposed side portion 1Bd. The bottom portion 1Ba is formed in a substantially rectangular shape. The side portions 1Bb and 1Bc are extended upward (in a direction of 90° with respect to the bottom portion 1Ba) from two adjacent sides at the bottom portion 1Ba respectively. The superimposed side portion 1Bd is extended from one side of the side portion 1Bc so as to overlap the outside surface of the side portion 1Bb. There is provided in the bottom portion 1Ba a hole 1Ba1 to be used to secure the bracket 1B to the other member (for example, the second chassis 151b) with a screw.

In the side portion 1Bb and the superimposed side portion 1Bd, through holes 1Be and 1Bf which are coaxial and of which both sides are cut in D shape are formed respectively. The diameter of the through hole 1Bf of the superimposed side portion 1Bd is larger than that of the through hole 1Be of the side portion 1Bb, so that an abutment face 1Bg is formed on the surface of the side portion 1Bb. The through holes 1Be and 1Bf are not necessarily coaxial or of similar figures, but have only to be overlapped with each other to form the openings passing through the side portion 1Bb and the superimposed side portion 1Bd, and the below-described studs 7 and 8 are capable of being inserted in these openings. The superimposed side portion 1Bd and the side portion 1Bb are formed to be an arc-shaped in a contour on the opposite side from the bottom portion 1Ba (at a portion of EK). The superimposed side portion 1Bd includes a base superimposed side portion 1Bdk in which the through hole 1Bf is open, and a connection 1Bh including a bent portion MG1 from the side portion 1Bc. The connection 1Bh is formed to be integral with the side portion 1Bc. The connection 1Bh is, for example, 2 mm in a width H.

When forming the bracket 1B, with respect to a plate material, in a blank-piercing process and a bending process, piercing of each through hole and bending of the bent portion MG1 at two points are firstly conducted at the same time, and subsequently bending of a bent portion MG2 is conducted. In this bending, the side portion 1Bb and the superimposed side portion 1Bd are not fully in close contact, but in a caulking process of a first stud 7 as described below, the side portion 1Bb and the superimposed side portion 1Bd can be brought in close contact. The first bracket 1A is formed in the same way.

Next, the base frame 2 will be described with reference to FIG. 7.

The base frame 2 is formed by pressing and bending a metal plate. Examples of metals that can be used include a stainless material or SPCC material of a thickness of 0.8 mm. In the case of the SPCC material, a surface thereof may be nitrided for a modification.

Figure 7:
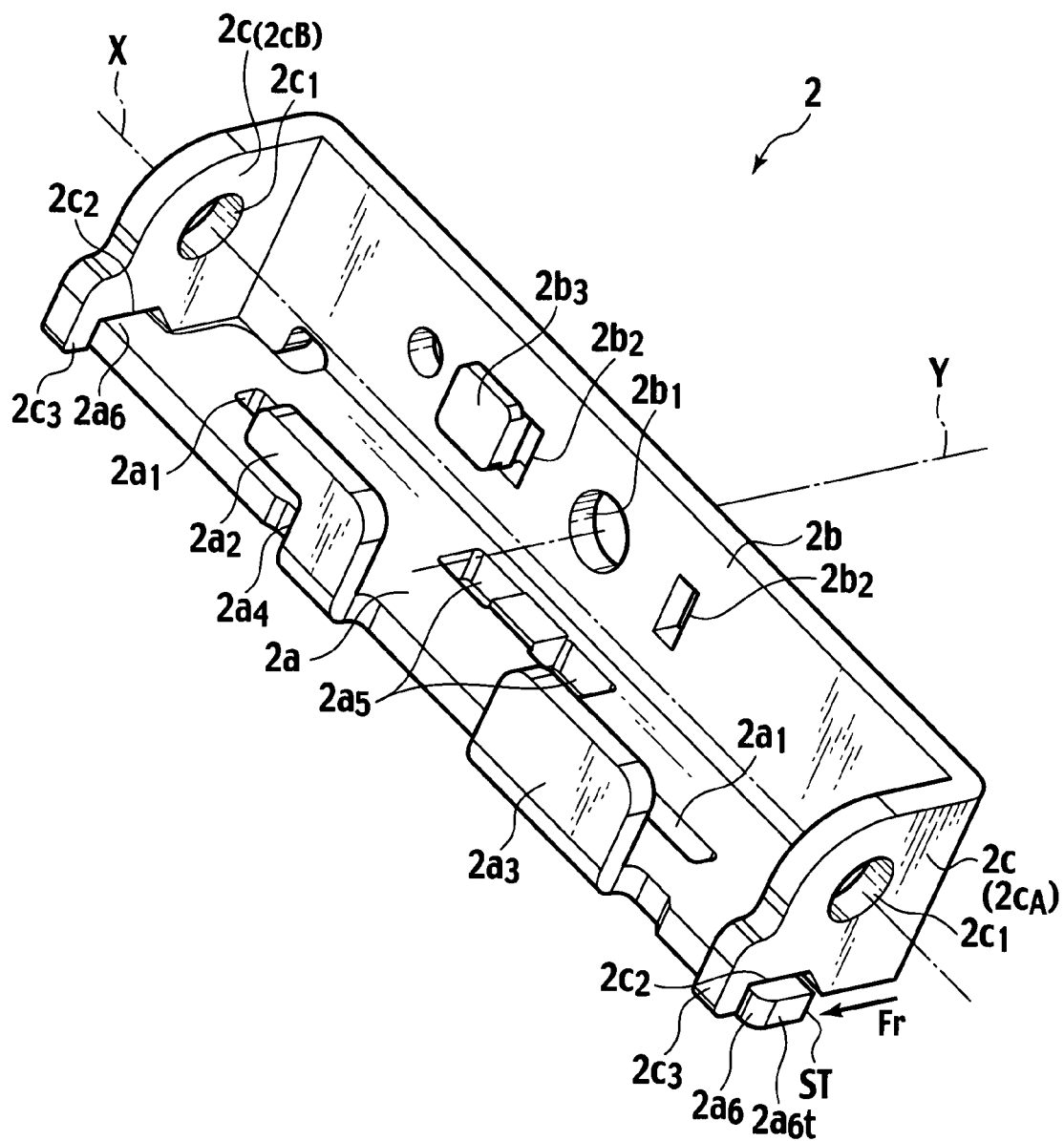
FIG. 7 is a perspective view of a second principal portion of the hinge apparatus according to the embodiment of the present invention.

As shown in FIG. 7, the base frame 2 includes a bottom portion 2a of a substantially rectangular shape, a longer side portion 2b bent 90° from a longer edge of the bottom portion 2a, and shorter side portions 2c and 2c bent 90° inward from both end face edges of the longer side portion 2b (first and second shorter side portions 2cA and 2cB).

There are formed in the shorter side portions 2c and 2c through holes 2c1 and 2c1 having a common axis X (hereinafter, referred to as the X-axis as well) respectively. In the hinge apparatus 50, this common axis is the x-axis.

In the bottom portion 2a, a pair of long holes 2a1 and 2a1 is formed being spaced apart along the X-axis. The long holes 2a1 and 2a1 extend along the X-axis direction. In the central vicinity of the bottom portion 2a, in a position symmetrical with respect to a through hole 2b1 (described below) formed in the longer side portion 2b, a pair of engaging holes 2a5 and 2a5 spaced apart is formed along the X-axis.

At a longer edge of the bottom portion 2a on the opposite side of the longer side portion 2b, there are provided an L-shaped uprising portion 2a2 and an uprising portion 2a3 that stand at approximately 90°. The L-shaped uprising portion 2a2 includes a notch 2a4 that is notched along the X-axis direction and formed in L shape, at the root side of the L-shaped uprising portion 2a2.

There is formed a through hole 2b1 substantially at the central portion of the longer side portion 2b. The central axis of the through hole 2b1 is the Y-axis in the hinge apparatus 50. In positions symmetrically sandwiching the through hole 2b1, a pair of square holes 2b2 and 2b2 spaced apart from each other in the X-axis direction is formed. In one square hole 2b2, a protruding portion 2b3 is formed by half-punching so as to be adjacent to the one square hole 2b2 to protrude inward in a rectangular shape.

At the end edge on the bottom portion 2a side of the shorter side portions 2c and 2c, cuts 2c2 and 2c2 partially cut are provided respectively. Extending portions 2a6 and 2a6 extending in the X-axis direction from the bottom portion 2a are engaged with the cuts 2c2 and 2c2 respectively. Each extending portion 2a6 is formed such that an end of the extending portion 2a6 protrudes outward from an external surface of the shorter side portion 2c. Contact surfaces ST and ST, being the surfaces on longer side portions of the protruding portions 2a6t and 2a6t protruding from the shorter side portions 2c and 2c, are contacted with side faces 1Ahs and 1Bhs of the connections 1Ah and 1Bh of the first and the second brackets 1A and 1B (refer to FIG. 6), to regulate the rotation about the X-axis of the hinge apparatus 50 (this regulation structure will be described below).

Next, a cam shaft 5 will be described in detail with reference to FIGS. 8 to 10.

Figure 5:
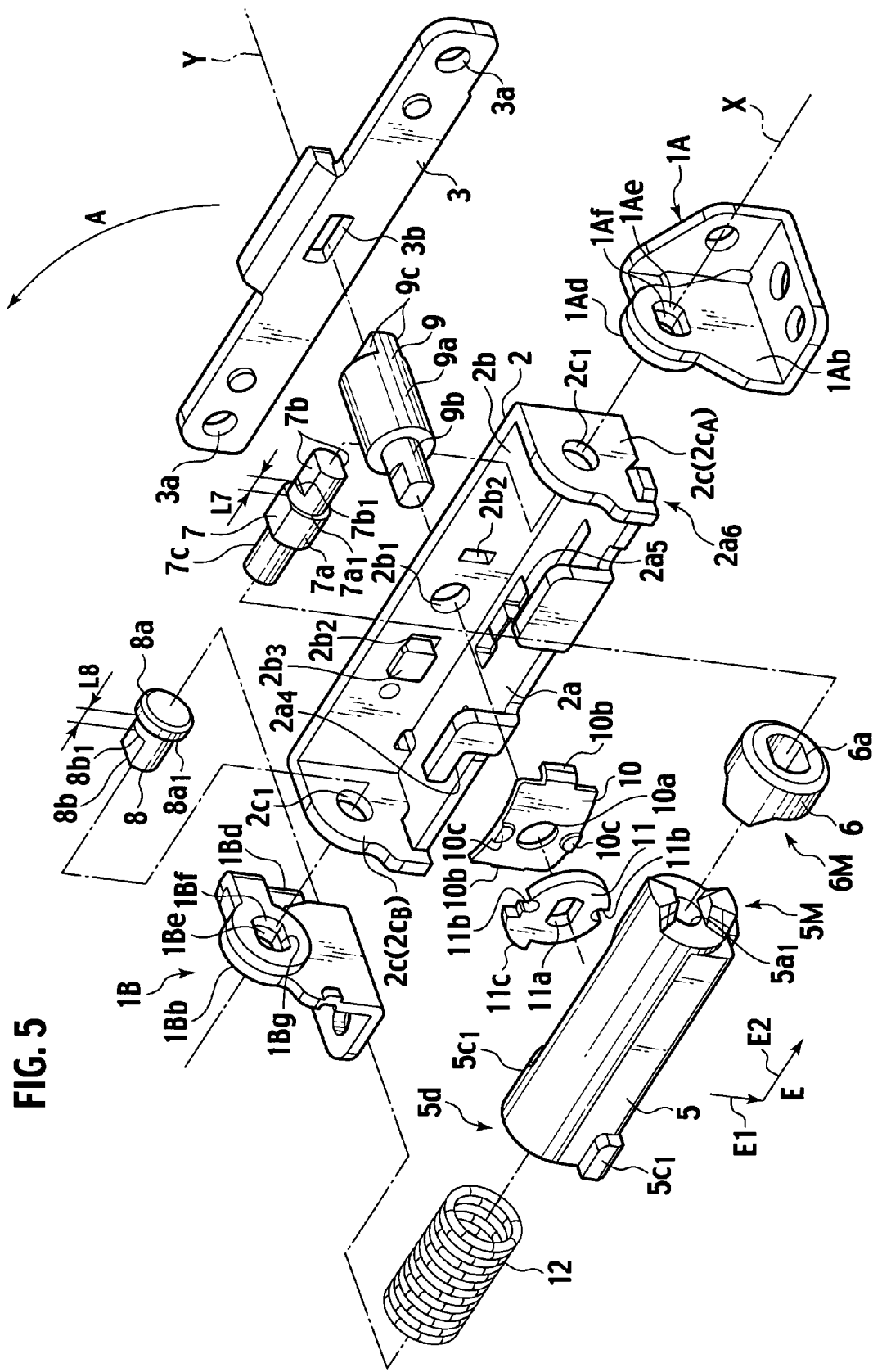
FIG. 5 is an exploded perspective view of the hinge apparatus according to the embodiment of the present invention.
Figure 8:
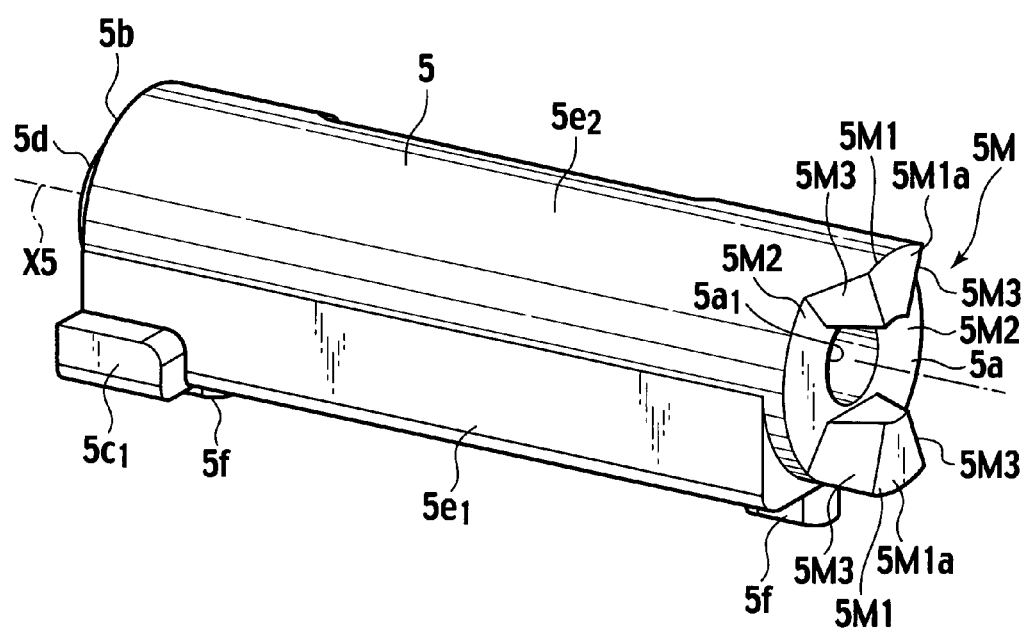
FIG. 8 is a first perspective view of a third principal portion of the hinge apparatus according to the embodiment of the present invention.

FIG. 8 is a view of the cam shaft 5 taken substantially in the same perspective direction as the perspective direction of the cam shaft 5 shown in FIG. 5. FIG. 9 is a view of the cam shaft 5 taken from left inner lower side to the front side of FIG. 8. FIG. 10 is a view of the cam shaft 5 taken from diagonally above the top of the cam shaft 5 shown in FIG. 9.

The cam shaft 5 has substantially a barrel shape, and is formed by coupling a semi-cylindrical portion 5e2 to a base portion 5e1 of a substantially rectangular parallelepiped. It is noted that axis X5 is to be a longitudinal direction of the cam shaft 5. The cam shaft 5 is formed of a synthetic resin. Example of the resin to be used includes PBT (polybutylene terephthalate). To further improve strength, PBT including glass fibers may be employed.

In an end face portion 5a of the cam shaft 5, a hole 5a1 of which central axis is the axis X5 is formed. A donut-like face, being a peripheral portion of the hole 5a1 is formed to be concavo-convex along a circumferential direction of the cam shaft 5. At the donut-like face, there is formed a cam portion 5M in which the circumferential direction of the cam shaft 5 is a cam face. A shown in FIG. 8, the cam portion 5M includes a pair of convex portions 5M1 and 5M1 in opposing positions (in positions of being shifted 180°) with the axis X5 sandwiched. Each convex portion 5M1 is formed in a surface shape of being from a reference plane 5M2 of the donut-like face, via an inclined face 5M3, and leading to a most protruding face 5M1a of the convex portion 5M1.

Figure 9:
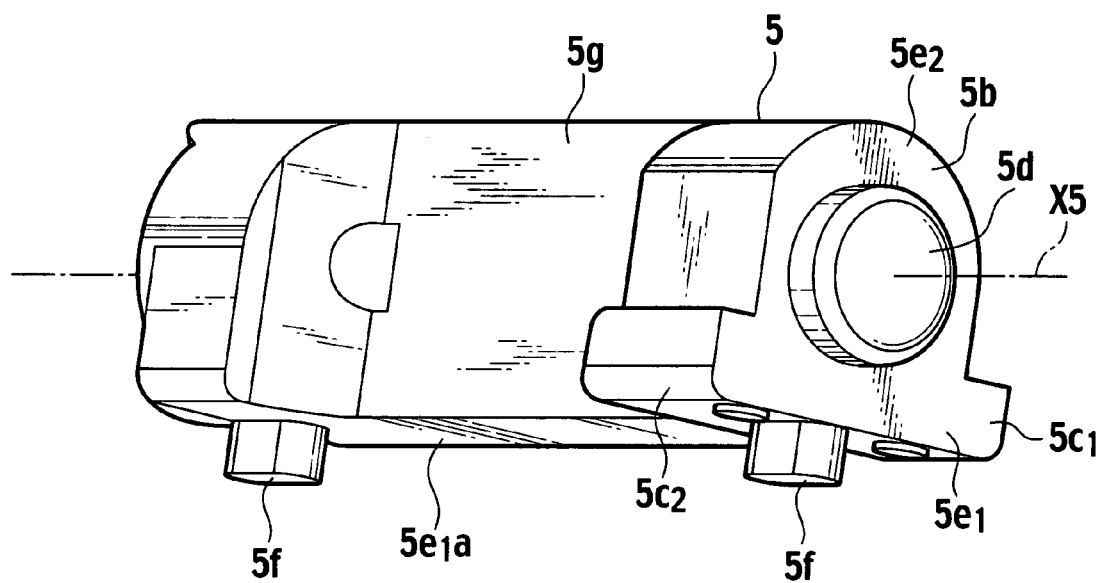
FIG. 9 is a second perspective view of the third principal portion of the hinge apparatus according to the embodiment of the present invention.
Figure 10:
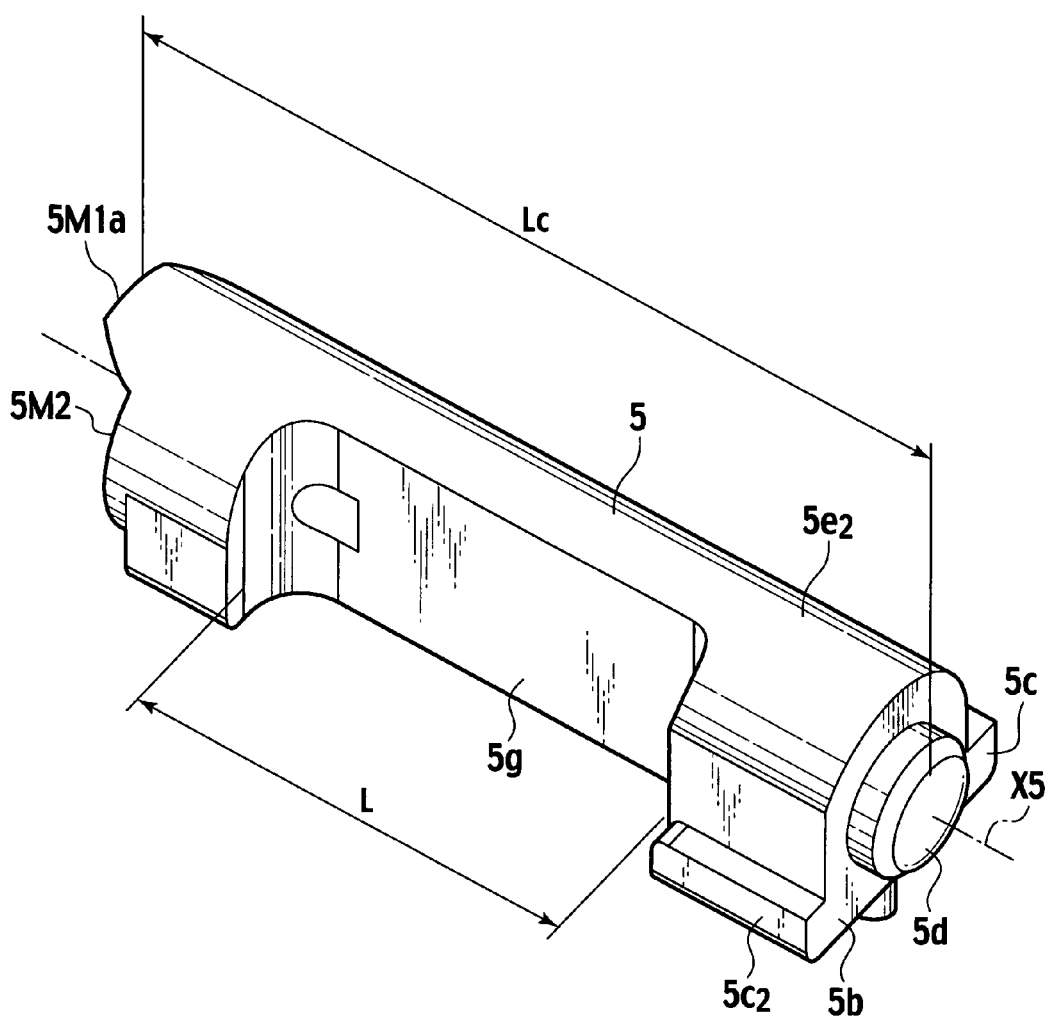
FIG. 10 is a third perspective view of the third principal portion of the hinge apparatus according to the embodiment of the present invention.

On the side face of the base portion 5e1 on the end face portion 5b side, a pair of protruding portions 5c1 and 5c2 protruding outward is provided (refer to FIG. 9 as well). A spring guide 5d (refer to FIG. 9 as well) protruding cylindrically with the axis X5 being a central axis is provided at the end face portion 5b. The axis X5 is coaxial with the X-axis when the cam shaft 5 is attached to the base frame 2.

As shown in FIG. 9, at the bottom portion 5e1a of the base portion 5e1, a pair of protruding portions 5f and 5f is provided spaced apart in a longitudinal direction of the cam shaft 5. Furthermore, in an intermediate portion in the longitudinal direction of the cam shaft 5, a convex portion 5g is formed such that the cam shaft 5 is of a substantially U shape. Hereinafter, the length in the longitudinal direction of the convex portion 5g is referred to as a length L (refer to FIG. 10).

Next, a cam ring 6 will be described in detail referring to FIGS. 11A and 11B.

Figure 11A:
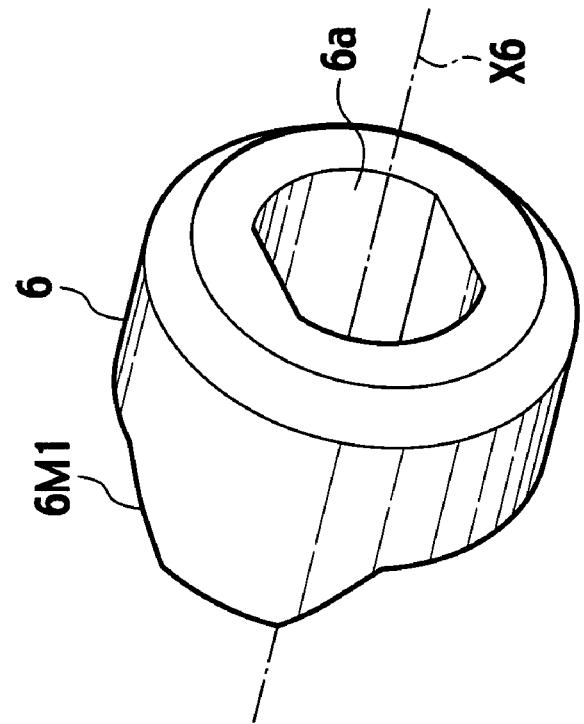
FIGS. 11A and 11B are perspective views of a fourth principal portion of the hinge apparatus according to the embodiment of the present invention.
Figure 11B:
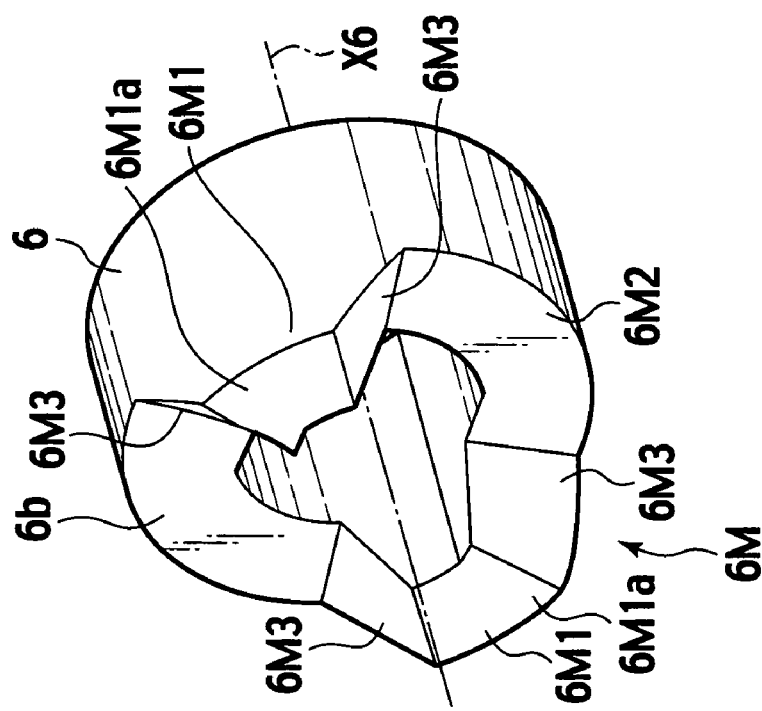

FIG. 11A is a perspective view of the cam ring 6 viewed from a face side opposed to the cam shaft 5. FIG. 11B is a view of the cam ring 6 taken from a face side opposite to the face opposed to the cam shaft 5, that is, taken in the same direction as the perspective direction of FIG. 5.

The cam ring 6 is formed of a synthetic resin. Examples of resins to be used include POM (polyacetal). In the cam ring 6, a through hole 6a of D cut on both faces is formed. The donut-like face, being a peripheral portion of the through hole 6a at an end face portion 6b of the cam ring 6, is formed to be concavo-convex along a circumferential direction of the cam ring 6. On the donut-like face, a cam portion 6M letting the circumferential direction of the cam ring 6 a cam face is formed. As shown in FIG. 11A, the cam portion 6M includes a pair of convex portions 6M1 and 6M1 in opposed positions with axis X6 sandwiched (in positions of being shifted 180°). Each convex portion 6M1 is formed in a surface shape of being from a reference plane 6M2, being the donut-like face, via an inclined face 6M3, and leading to a most protruding face 6M1 of the convex portion 6M1. In the hinge apparatus 50, as described below, the cam ring 6 is integrated with the cam shaft 5 such that the cam portions 5M and 6M can relatively rotate while being pressed to each other in the same axis as the cam shaft 5. Therefore, depending on a cam shape of the cam portions 5M and 6M, a frictional touch in rotation, a click feel in rotation, or a rotation angle at which the click feel is exhibited can be set without restraint.

In this embodiment, in an angle range in which the convex portions 5M1 and 5M1 of the cam portion 5M are contacted with the convex portions 6M1 and 6M1 of the cam portion 6M, a rotation resistance is large. In an angle range in which the convex portions 5M1 and 5M1 of the cam portion 5M are not contacted with the convex portion 6M1 and 6M1 of the cam portion 6M, a rotation resistance is small. Thereby, this enables the video camera 150 to provide a click feel to a user.

Next, referring to FIG. 5, a first to a third studs 7 to 9 will be described.

The first stud 7 is formed of a base cylindrical portion 7a formed with D cuts on both sides of the first stud 7, and first and second shaft portions 7b and 7c extending coaxially from the base cylindrical portion 7a and having a smaller diameter than that of the base cylindrical portion 7a. On both sides of a tip end of the first shaft portion 7b, D cuts corresponding to two D cuts of the base cylindrical portion 7a are formed.

The second stud 8 is formed of a circular flange portion 8a and a shaft portion 8b extending coaxially with the flange portion 8a. On both sides of a tip end of the shaft portion 8b, D cuts are formed.

The third stud 9 is formed of a base cylindrical portion 9a and a shaft portion 9b extending coaxially from the base cylindrical portion 9a and having a smaller diameter than that of the base cylindrical portion 9a. On both sides of a tip end of the shaft portion 9b, D cuts are formed. Also on both sides of an end opposite from the shaft portion 9b at the base cylindrical portion 9a, D cut portions 9c and 9c are formed.

The first to the third studs 7 to 9 are made of a metal material. As materials thereof, for example, a stainless can be used.

With reference to FIG. 5, further, a sub frame 3, a spring plate 10 and a lock plate 11 will be described.

The sub frame 3 possesses a substantially rectangular shape, and is formed by pressing and bending a metal plate.

As metals that can be used, there is a stainless material or SPCC material of a thickness of 0.8 mm. In the case of the SPCC material, the surface thereof may be nitrided for modification.

On both end sides in a longitudinal direction of the sub frame 3, a pair of through holes 3a and 3a for securing the sub frame 3 to the other part with screws are formed. As this other part, for example, there is the frame 152a of the image displaying panel 152 (refer to FIG. 4). In specific, the sub frame 3 is engaged without a looseness with the engaging portion 152a2 that is formed at the rib 152a1 provided at the frame 152, and secured to the frame 152 through the through holes 3a with screws (not shown) to be attached integrally with the image displaying panel 152.

In a central vicinity of the sub frame 3, a square hole 3b letting the direction along the longitudinal direction of the sub frame 3 a longitudinal direction is formed. The square hole 3b is fit to the D cut portions 9c and 9c of the third stud 9.

The spring plate 10 is made of a metal plate material (e.g., a stainless plate or a phosphor bronze plate) having spring properties, and formed in a shape of a part of a cylindrical surface gently curved such that a central portion of the spring plate 10 protrudes. In a central vicinity of the spring plate 10, a through hole 10a is formed. At a pair of side edges of the spring plate 10 exhibiting a straight line, bent portions 10b and 10b are formed respectively. At a pair of the side edges of the spring plate 10 exhibiting a curved line, convex portions 10c and 10c protruding in a direction opposite to a protruding direction of the bent portions 10b and 10b are formed respectively.

The lock plate 11 possesses a substantially circular shape, and is made of a metal plate such as stainless. At a central portion of the lock plate 11, a through hole 11a of which both sides are D-cut is formed. At an outer edge of the lock plate 11 opposed to the D-cut side edges of the through hole 11a, notches 11b and 11b of a semi-circular arc are formed respectively. In a predetermined angle range at the outer edge of the lock plate 11, a projecting portion 11c projecting outside in a radial direction is formed.

Next, the entire structure of the hinge apparatus 50 will be described. The hinge apparatus 50 includes two rotation axes of the X-axis and the Y-axis. In order of about the Y-axis and about the X-axis, a rotation structure of the hinge apparatus 50 will be described.

<Rotation Structure about Y-Axis>

As shown in FIG. 5, the third stud 9 is integrated with the sub frame 3 by fitting the D cut portions 9c and 9c of the third stud 9 into the square hole 3b of the sub frame 3 to be caulked. The shaft portion 9b of the third stud 9 is inserted from the outside of the base frame 2 in the through hole 2b1 of the longer side portion 2b of the base frame 2. The shaft portion 9b having been inserted in the through hole 2b1 is inserted in the through hole 10a of the spring plate 10. The third stud 9 is integrated with the lock plate 11 by inserting the shaft portion 9b having been inserted in the through hole 10a into the through hole 11a of the lock plate 11 to be caulked.

The bent portions 10b and 10b of the sprig plate 10 are engaged with the square holes 2b2 and 2b2 of the base frame 2, whereby the spring plate 10 is regulated from rotating about the Y-axis. Moreover, caulking of the shaft portion 9b is conducted by collapsing a predetermined amount of the spring plate 10 via the lock plate 11, so that the spring plate 10, due to elastic repulsive force of the spring plate 10, biases the lock plate 11 in the Y-axis direction all the time. Therefore, the lock plate 11 can be rotated about the Y-axis while generating a predetermined frictional force with respect to the spring plate 10. That is, although the sub frame 3 is held by the base frame 2 via the third stud 9 by the frictional force between the spring plate 10 and the lock plate 11, the sub frame 3 can be rotated in a predetermined angle range about the Y-axis when force against this frictional force is applied to the sub frame 3.

Accompanied by the rotation about the Y-axis of the lock plate 11, when the lock plate 11 has reached one of two second rotation angle positions, the convex portions 10c and 10c of the spring plate 10 are fit into the notches 11b and 11b. By alternating between this fit and a release from the fit, a click feel accompanied by the rotation about the Y-axis of the image displaying panel 152 can be provided to a user.

FIG. 5 shows an angular position in which the notches 11b and 11b and the convex portions 10c and 10c are fit to each other. Furthermore, accompanied by the rotation about the Y-axis of the lock plate 11, when the lock plate 11 has reached one of the two second rotation angle positions, one of both end face portions of the projecting portion 11c is contacted with one end face of a pair of the engaging holes 2a5 and 2a5 of the base frame 2. Whereby, the image displaying panel 152 is inhibited from rotating. Thus, the sub frame 3 can be rotated within a predetermined angle range about the Y-axis with respect to the base frame 2.

<Rotation Structure about X-Axis>

First, the connection between the first and the second brackets 1A and 1B and the base frame 2 will be described.

As shown in FIGS. 3, 5 and 6, the first shaft portion 7b of the first stud 7 is inserted into the through hole 2c1 of the shorter side portion 2c from the inside of the base frame 2. Furthermore, the first shaft portion 7b is inserted through the through holes 1Af and 1Ae from the superimposed side portion 1Ad side of the first bracket 1A.

At the first shaft portion 7b, on the root side of the portion provided with two D cuts, contact faces 7b1 and 7b1 laid at right angles to the axis of the first shaft portion 7b are formed. The contact faces 7b1 and 7b1 are brought in contact with the contact face 1Ag of the first bracket 1A (refer to FIG. 6), whereby the axis of the first stud 7 is aligned with the X-axis of the hinge apparatus 50. Due to that two D cuts of the first shaft portion 7b are brought in engagement with two D cuts of the first bracket 1A, the first shaft portion 7b is inhibited from rotating about the X-axis.

A distance L7 in the X-axis direction between each contact face 7b1 of the first shaft portion 7b and the end face 7a1 of the base cylindrical portion 7a is set to be slightly larger than a plate thickness of the shorter side portion 2c of the base frame 2. Therefore, when the tip end of the first shaft portion 7b having passed through the through hole 1Ae is secured by caulking, the base frame 2 is rotatably supported with respect to the first bracket 1A without a resistance about the X-axis. Furthermore, the side portion 1Ab and superimposed side portion 1Ad of the first bracket 1A are pressed in the axial direction of the side portion 1Ab and the superimposed side portion 1Ad when the side portion 1Ab and the superimposed side portion 1Ad are caulked, so that they are connected integrally with the first stud 7 in a close contact state.

The second bracket 1B and the base frame 2 are connected to each other with the second stud 8. The shaft portion 8b of the second stud 8 is inserted through the through hole 2c1 of the other shorter side portion 2c from the inside of the base frame 2. Furthermore, the shaft portion 8b is inserted through the through holes 1Bf and 1Be from the superimposed side portion 1Bd side of the second bracket 1B.

At the shaft portion 8b, on the flange portion 8a side at the portion provided with two D cuts, contact faces 8b1 and 8b1 laid at right angles to the axis of the shaft portion 8b are formed. The contact faces 8b1 and 8b1 are brought in contact with the contact face 1Bg of the second bracket 1B, whereby the axis of the second stud 8 is aligned with the X-axis of the hinge apparatus 50. Due to that two D cuts of the shaft portion 8b are brought in engagement with two D cuts of the second bracket 1B, the shaft portion 8b is inhibited from rotating about the X-axis.

A distance L8 in the X-axis direction between each contact face 8b1 of the shaft portion 8b and an end face 8a1 on the shaft portion 8b side of the flange portion 8a is set to be slightly larger than a plate thickness of the shorter side portion 2c of the base frame 2. Therefore, when the tip end of the shaft portion 8b having passed through the through hole 1Be is secured by caulking, the base frame 2 is rotatably supported with respect to the second bracket 1B without a resistance about the X-axis. Furthermore, the side portion 1Bb and superimposed side portion 1Bd of the second bracket 1B are pressed in the axial direction of the side portion 1Bb and the superimposed side portion 1Bd when the side portion 1Bb and the superimposed side portion 1Bd are caulked, so that they are connected integrally with the second stud 8 in a close contact state.

Next, in rotation operation about the X-axis, the cam mechanism M1 providing a user with a frictional touch and a click feel will be described.

As shown in FIG. 5, the base cylindrical portion 7a and second shaft portion 7c of the first stud 7 are inserted in the through hole 6a of the cam ring 6. Here, two D cuts of the base cylindrical portion 7a are engaged with two D cuts of the through hole 6a, so that the cam ring 6 is inhibited from rotating with respect to the first stud 7.

On one end side of the coil spring 12, the coil spring 12 is engaged with the flange portion 8a of the second stud 8 to be located on the X-axis of the hinge apparatus 50. Although the shaft portion extending from the flange portion 8a of the second stud 8, in this embodiment, is only the shaft portion 8b, depending on an inside diameter of the coil spring 12, another shaft portion extending on the opposite side from the shaft portion 8b (on the coil spring 12 side) may be included.

The cam shaft 5 is located on the X-axis such that the spring guide 5d (refer to FIG. 9) is engaged with the other side of the coil spring 12 and the cam portion 5M is engaged with the cam portion 6M of the cam ring 6. Furthermore, in the hole 5a1 of the cam shaft 5, a tip end of the shaft portion 7c of the first stud 7 is inserted.

Here, the inside diameter of the coil spring 12 is larger than the outside diameter of the flange portion 8a of the second stud 8 and the outside diameter of the spring guide 5d of the cam shaft 5, so that the coil spring 12 and the flange portion 8a are engaged well with the coil spring 12 and the spring guide 5d without an axial misalignment.

Owing to the above-mentioned construction, each member is set to be of a length in the X-axis direction such that the coil spring 12 is compressed a predetermined amount in a longitudinal direction of the coil spring 12. Thus, by elastic repulsive force of the coil spring 12 generated by this compression, the coil spring 12 biases the cam shaft 5 in a direction in which the cam portion 5M presses the cam portion 6M.

The cam shaft 5 is inhibited from rotating about the X-axis with respect to the base frame 2 and located so as to be capable of reciprocating and sliding a predetermined distance in the X-axis direction of the hinge apparatus 50. In specific, the protruding portions 5c1 and 5c1 of the cam shaft 5 are engaged with the notch 2a4 and the gap between the protruding portion 2b3 on the longer side portion 2b and the bottom portion 2a respectively. In addition, the protruding portions 5f and 5f (refer to FIG. 9) of the cam shaft 5 are engaged with the long holes 2a1 and 2a1 of the base frame 2 (refer to FIG. 7) respectively.

In these engagement structures, an engagement configuration on the base frame 2 side is a notch or a hole extending in the X-axis direction, and the width in a direction orthogonal to the X-axis of these notch and hole is set to be substantially the same as the width of the protrusion or the protruding portion on the cam shaft 5 side. Therefore, the cam shaft 5 can be moved with respect to the base frame 2, in a permissible range in the X-axis direction to be set depending on the shape of the long hole 2a1 or the notch 2a4.

Figure 12:
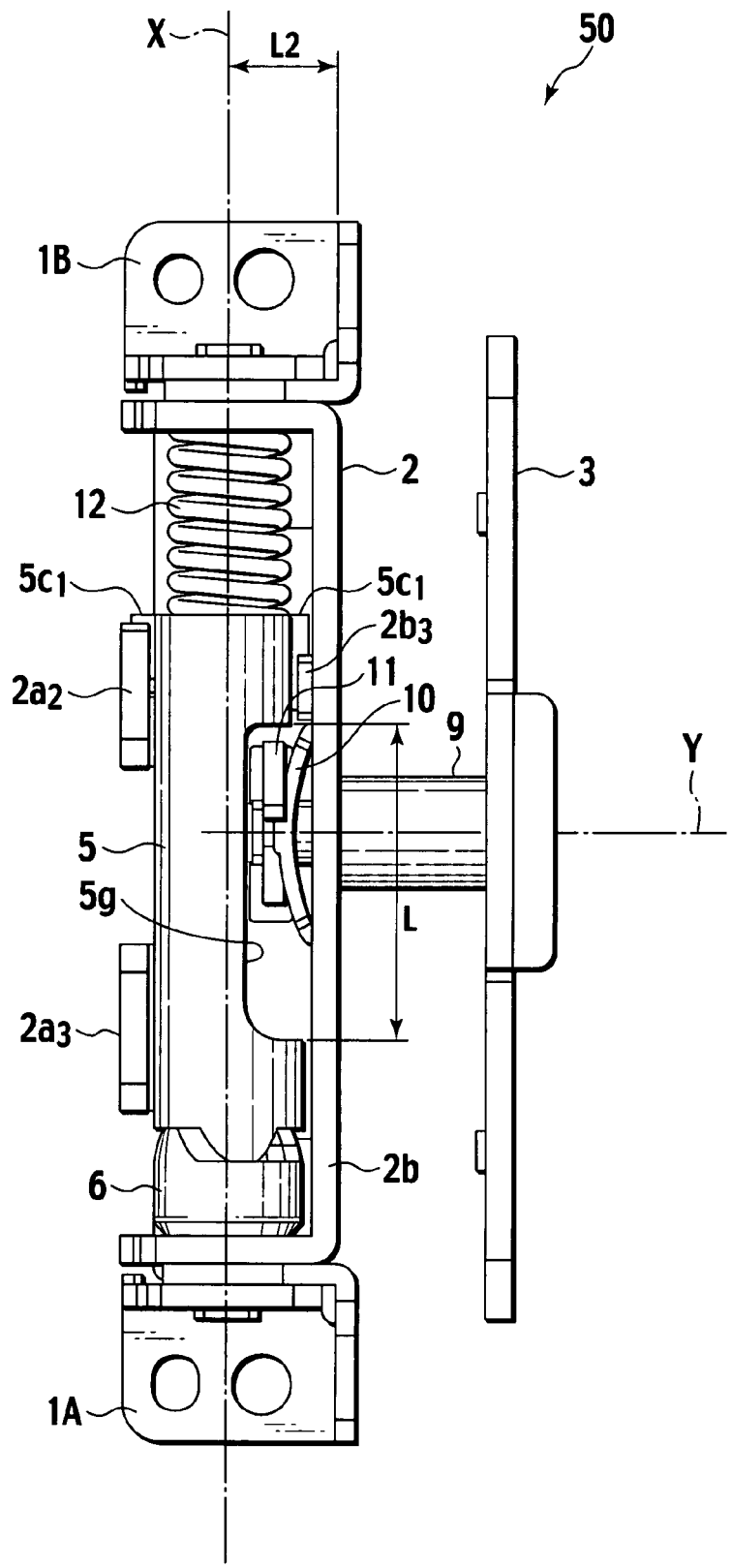
FIG. 12 is a plan view of the hinge apparatus according to the embodiment of the present invention.

FIG. 12 is a view of the hinge apparatus 50 taken in a direction orthogonal to the X-axis and the Y-axis. As shown in FIG. 12, the L-shaped uprising portion 2a2 and the uprising portion 2a3 provided at the base frame 2 are formed along the side face of the cam shaft 5. The cam shaft 5 is held such that the looseness in a direction orthogonal to the X-axis is of a minimal amount, between the L-shaped uprising portion 2a2 and the longer side portion 2b and between the uprising portion 2a3 and the longer side portion 2b, so that this engagement structure prevents the cam shaft 5 from being released from on the X-axis.

In the concave portion 5g provided at the cam shaft 5, the spring plate 10 and the lock plate 11 are contained. Therefore, by the portion at which the spring plate 10 and the lock plate 11 comes in the concave portion 5g, a distance L2 between the X-axis and an outer surface of the longer side portion 2b of the base frame 2 can be shorter. As a result, the hinge apparatus 50 can be downsized further, and thus the image displaying apparatus 150 using the hinge apparatus 50 can also be downsized.

A length L in the longitudinal direction of the concave portion 5g is set to be in such a length as not to interfere with other members when the cam shaft 5 is integrated into the base frame 2. Specifically, when the cam shat 5 is integrated into the base frame 2, a pair of the protruding portions 5c1 and 5c1 is contained in the base frame 2 in a position of not interfering with the L-shaped uprising portion 2a2 and the protruding portion 2b3 (indicated by an arrow E1 of FIG. 5), and thereafter slides in the X-axis direction (indicated by an arrow E2 of FIG. 5). Thus, the length L of the concave portion 5g is set so as to obtain the escape with respect to a mating portion corresponding to sliding operation indicated by the arrow E2.

Figure 13A:
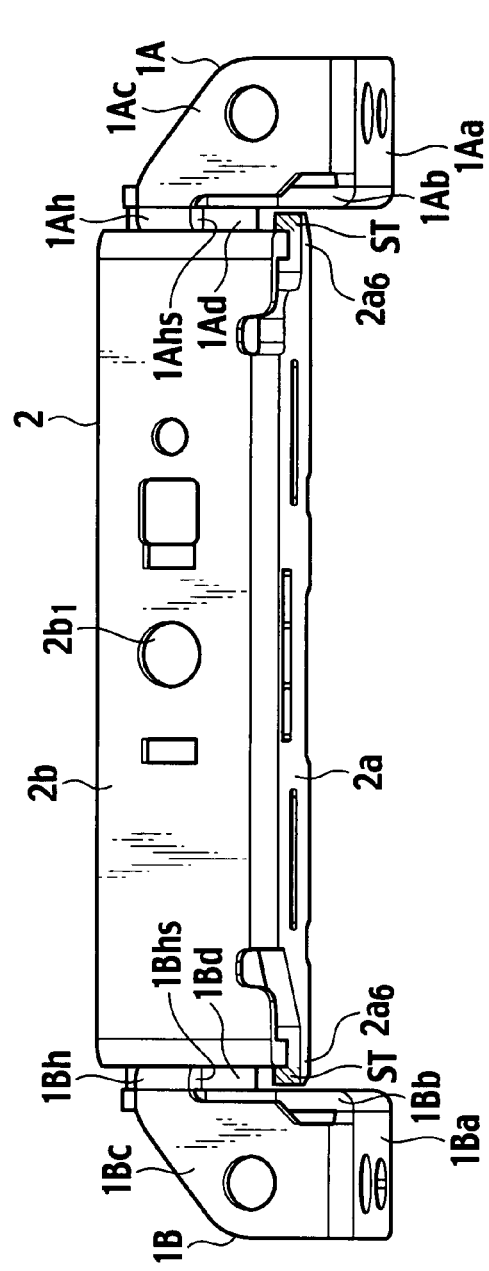
FIGS. 13A and 13B are explanatory views for use in illustrating rotation operation in the hinge apparatus according to the embodiment of the present invention.
Figure 13B:
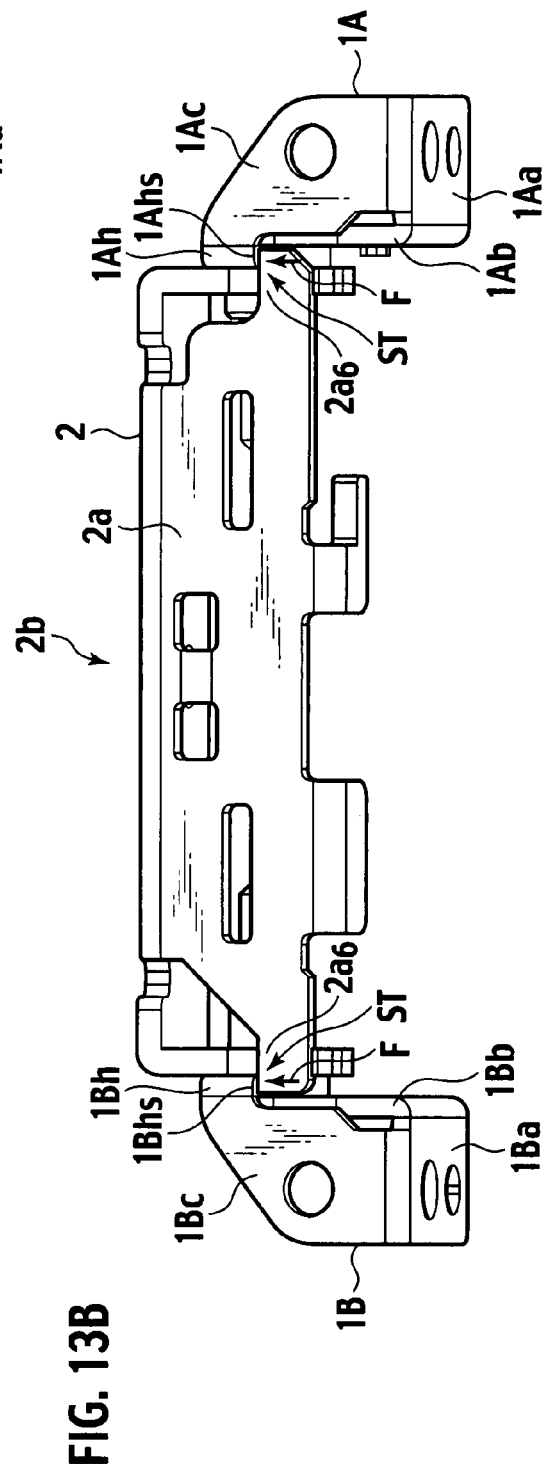

Next, with reference to FIGS. 13A and 13B, a regulation structure of a rotation range about the X-axis (hereinafter, referred to as a stopper structure) will be described. In FIGS. 13A and 13 B, only the base frame 2 and the first and the second brackets 1A and 1B are shown. In particular, in FIG. 13A, the base frame 2 and the first and the second brackets 1A and 1B in the basic position (position shown in FIG. 5) are shown. In FIG. 13B, shown are the base frame 2 and the first and the second brackets 1A and 1B in a position (the first rotation position) where the base frame 2 is turned 90° in a direction indicated by an arrow A shown in FIG. 5 from the basic position. Incidentally, in the first rotation position, the base frame 2 is regulated from being turned further in the direction indicated by the arrow A shown in FIG. 5.

The contact faces ST and ST, being a part of the faces of the extending portions 2a6 and 2a6 of the bottom portion 2a of the base frame 2 and being the diagonally shaded areas in FIG. 13A, are contacted with the side faces 1Ahs and 1Bhs of the connections 1Ah and 1Bh respectively. In the case where the base frame 2 is turned more than 90° from the basic position in the direction indicated by the arrow A shown in FIG. 5, compressive forces F and F act on the connections 1Ah and 1Bh from the contact faces ST and ST.

With reference to the second bracket 1B shown in FIG. 6, the action of the compressive force F will be described.

Due to that the bottom portion 1Ba is secured to the other member and that the superimposed side portion 1Bd and the side portion 1Bc are formed by bending with respect to the bottom portion 1Ba, when strong compressive force F is acted on the side face 1Bhs, the second bracket 1B tends to deform in a direction indicated by a broken-line arrow HK. However, the superimposed side portion 1Bd is in close contact with the side portion 1Bc to be secured by caulking to the second stud 8. Therefore, since the compressive force F is received by the superimposed side portion 1Bd, the side portion 1Bc and the second stud 8 in cooperation, the second bracket 1B exhibits an extremely high strength with respect to a bend in the direction indicated by the broken-line arrow HK. Incidentally, the portion of the first and the second brackets 1A and 1B and with which the contact face ST of the base frame 2 positioned on the rotation side is contacted may be provided at the side portions 1Ac and 1Bc, or the first stud 7 and the second stud 8.

Whereas, due to that the contact faces ST and ST on the main frame 2 side are the faces of the extending portions 2a6 and 2a6, when the contact faces ST and ST are brought in contact with the side faces 1Ahs and 1Bhs of the connections 1Ah and 1Bh, the extending portions 2a6 and 2a6, as shown in FIG. 7, are acted with reaction forces Fr and Fr against the compressive forces F and F. As described above, the extending portions 2a6 and 2a6 are engaged with the cuts 2c2 and 2c2 formed in the shorter side portions 2c and 2c respectively, even if the extending portions 2a6 and 2a6 are going to deform in a direction in which the reaction forces Fr and Fr are acted, the extending portions 2a6 and 2a6 are contacted with the side face of the cuts 2c2 and 2c2. Thus, since arm-like engaging portions 2c3 and 2c3 forming the side faces of the cuts 2c2 and 2c2 receive the reaction force Fr, the main frame 2 side also has an extremely high strength as a stopper.

Like this, the hinge apparatus 50 possesses an extremely high stopper strength regulating the rotation about the X-axis, even if the main frame is going to be forcibly rotated with exceeding a regulated angular position, it is much less likely to be broken. Incidentally, as described above, due to that both the first and the second brackets 1A and 1B are provided with a stopper structure, a high strength can be obtained to be favorable. However, either one of the first and the second brackets 1A and 1B may be provided with a stopper structure. Even in this case, a high rotation-regulating strength can be obtained. Moreover, due to that both the first and the second brackets 1A and 1B side and the main frame 2 side that are contacted with each other are constructed to be of the above-described configuration, a high strength can be obtained to be favorable. However, either one of the first and second brackets 1A and 1B side and the main frame 2 side may be of the above-described configuration or construction. Even in this case, a high rotation-regulating strength can be obtained.

In the image displaying apparatus 150 provided with the hinge apparatus 50, even if a user is going to open the image displaying panel 152 with exceeding a predetermined rotation-regulating angular position (for example, 90°), the hinge apparatus 50 is extremely hard to be broken, so that a significantly high reliability can be obtained. In the stopper structure about the X-axis, the bracket 1A (1B) can be regarded to construct such a closed loop (annular structure) as the bottom portion 1Aa (1Ba)→the side portion 1Ac (1Bc)→the superimposed side portion 1Ad (1Bd)→the stud 7 (8)→the side portion 1Ab (1Bb)→the bottom portion 1Aa (1Ba). In addition, the compressive force F is received at any component of this loop.

Normally, such a closed loop configuration is extremely hard to deform from the inside to the outside, so that the above-described stopper structure is thought to have a high strength with respect to the deformation.

With tests conducted by the inventors, as compared with a comparative example in which the loop structure is cut, specifically the comparative example in which the stud 7 (8) is removed, in respect of the deformation of the connection 1Ah (1Bh) provided by the compressive force F, the above-described loop structure is confirmed to have not less than twice the strength. That is, even if the thickness of the components is made smaller or the shape thereof is made smaller, the strength equal to or higher than that of the comparative example will be obtained, thus enabling cost down or a further downsizing.

In the hinge apparatus 50, owing the above-described construction, the sub frame 3 is turned in a direction indicated by an arrow A1 about the X-axis with respect to the first and the second brackets 1A and 1B from the basic rotation position shown in FIG. 3, the main frame 2 that is coupled to the sub frame 3 through the third hinge 9 is turned integrally with the sub frame 3 as well. Accompanied by this rotation of the main frame 2, the cam shaft 5 and the coil spring 12 biasing the cam shaft 5 toward the cam ring 6 side that are held in the main frame 2 are rotated integrally.

On the other hand, the cam ring 6 is inhibited from rotating with respect to the first bracket 1A with the first stud 7, so that by the rotation of the main frame 2, the cam portion 5M of the cam shaft 5 and the cam portion 6M of the cam ring 6 are slid about the X-axis while being biased to each other.

Accompanied by the rotation of the main frame 2, the cam shaft 5 reciprocates in the X-axis direction depending on the cam shape of the cam portions 5M and 6M. Thus, by this reciprocation, the amount of deflection of the coil spring 12 is changed, and biasing force biasing the cam shaft 5 is changed. This change of the biasing force is touched as a rotational feel by a user, as well as recognized as a click feel.

The cam shaft 5 is only reciprocated in the X-axis direction with respect to the main frame 2 and the cam shaft 5 is provided with the concave portion 5g recessed in an axial range not less than the stroke of this reciprocation. Thus, not depending on the rotation angular position of the main frame 2, the rotation-regulating mechanism M2 about the Y-axis can be housed in the concave portion 5g, and thus, the hinge apparatus 50 can be made extremely compact.

In the hinge apparatus 50, depending on the cam shape of the cam portions 5M and 6M to be engaged with each other, a desired click feel can be obtained in a predetermined rotation position.

Moreover, the coil spring 12, the cam shaft 5 and the cam ring 6 can be easily replaced. This replacement can be conducted due to that the hinge apparatus 50 is constructed to include no shaft member passing through each of the first and the second brackets 1A and 1B supporting the base frame 2 to be secured to the first and the second brackets 1A and 1B. In specific, this replacement can be conducted due to that a distance Ls between the tip ends of the first and the second studs 7 and 8 (refer to FIG. 14) is set to be longer than an entire length Lc of the cam shat 5 (refer to FIG. 10). Whereby, the came shaft 5 can be removed without being caught by the first and the second studs 7 and 8. Here, the entire length Lc of the cam shaft 5 is sufficient on the supposition of letting the most protruding face 5M1a of the cam portion 5M a reference. However, depending on a cam shape, the entire length Lc may be determined by letting the reference plane 5M2 a reference. In this respect, either case may be set depending on a cam position when the cam shaft 5 is removed.

Figure 14:
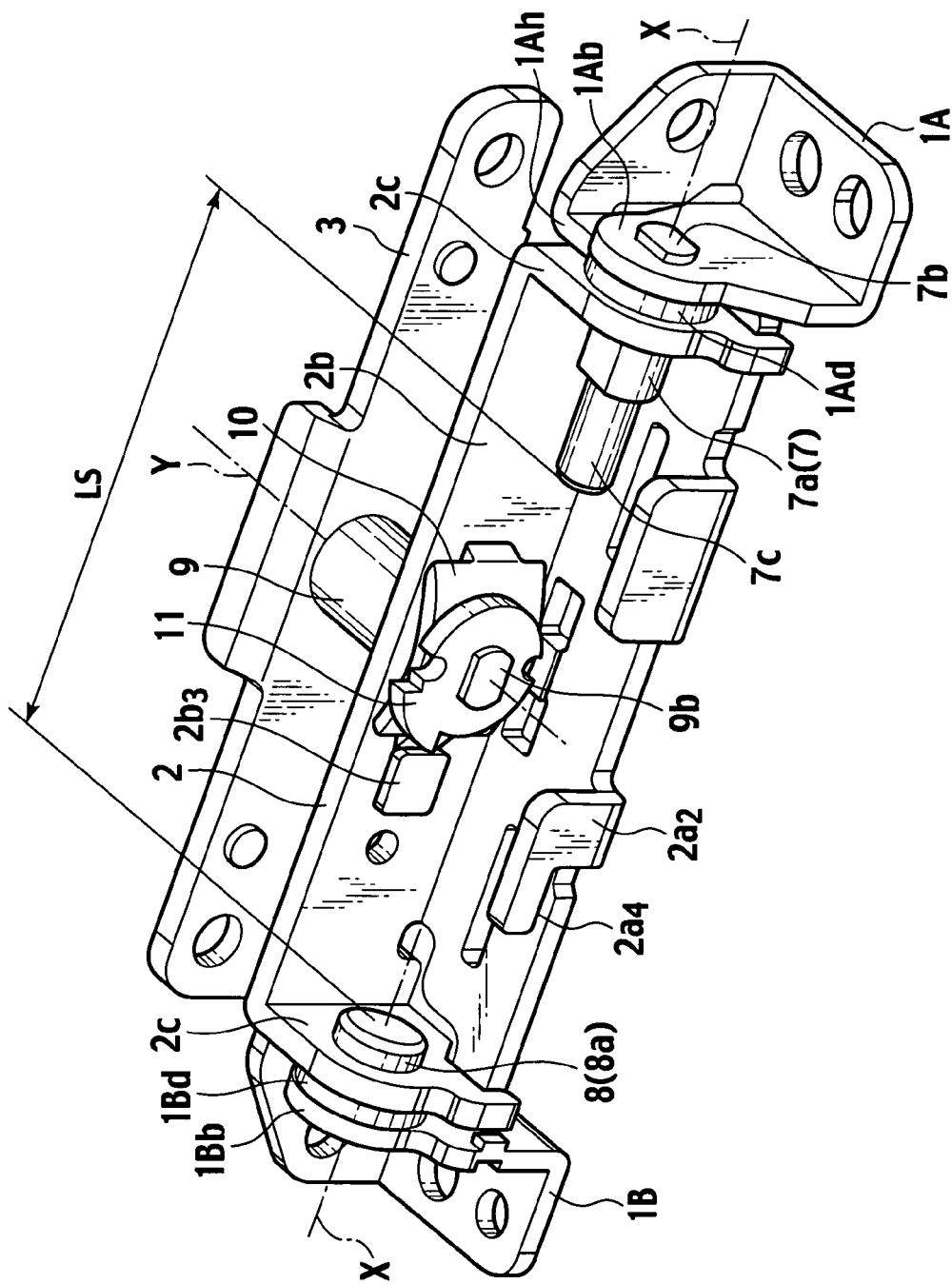
FIG. 14 is a perspective view of the hinge apparatus according to the embodiment of the present invention.

The replacement of the coil spring 12, the cam shaft 5 and the cam ring 6 will be described specifically. First, by the compression of the coil spring 12 in the X-axis direction, the coil spring 12 is disengaged from the flange portion 8a of the second stud 8 and the spring guide 5d of the cam shaft 5 to be removed from on the X-axis. Subsequently, by sliding the cam shaft 5 in the direction opposite to an arrow E2 in FIG. 5, the cam shaft 5 is disengaged from the main frame 2, and thus the cam shaft 5 can be easily removed. When the cam shaft 5 is removed from the main frame 2, the cam ring 6 comes off from the second shaft portion 7c of the first stud 7 by being axially slid, so that the cam ring 6 can be removed. FIG. 14 shows a state in which the coil spring 12, the cam shaft 5 and the cam ring 6 are removed from the main frame 2. Like this, in the hinge apparatus 50, the coil spring 12, the cam shaft 5 and the cam ring 6 can be easily replaced independently of each other, so that by the replacement of or in combination of the other coil spring, cam shaft, or cam ring of different spring constants, cam portion configurations, protruding positions of a cam portion, a rotation specification (rotation resistance, click feel, rotation angular position where the click feel can be obtained) in rotation about the X-axis can be freely or easily set.

Even if members other than the coil spring 12, the cam shaft 5 and the cam ring 6 are shared, the hinge apparatus 50 can be used in a variety of image displaying apparatuses of different rotation specifications of an image displaying panel, so that an extremely inexpensive image displaying apparatus 150 can be provided.

From the viewpoint that in the hinge apparatus 50, a rotation body 50B is made to turn about the X-axis with respect to the fixed body 50A, the fixed body 50A includes the first and the second brackets 1A and 1B, the first and the second studs 7 and 8 and the cam ring 6, and the rotation body 50B includes the base frame 2, the coir spring 12 and the cam shaft 5. The third stud 9 and the like turned along with the base frame 2 are included in the rotation body 50B.

The hinge apparatus according to the present invention is not limited to the above-described construction and procedure, but may be modified without departing from the gist of the present invention.

A lubricant such as grease may be applied to a sliding portion of each member.

The length of the cam shaft 5 or the cam ring 6 is not limited to the above-described axial length. Even in any shape (length), the concave portion housing the rotation-regulating mechanism M2 is desired to form somewhere.

D cut on both faces of engaging portion may be D cut on one face of the engaging portion.

An image displaying apparatus to which the hinge apparatus is applicable is not limited to a video camera, and insofar as an apparatus is provided with a thin image displaying panel, it is not limited to a video camera. The hinge apparatus can be applied to various apparatuses, for example, a digital still camera, a notebook computer, a mobile phone, PDA (Personal Digital Assistants), a mobile television, a game apparatus and a portable optical disk player.

Even if an image displaying panel is a panel having a function other than displaying an image, for example, an operation panel on which operation buttons are arranged, the hinge apparatus can be applied.

Although the above-described hinge apparatus is constructed to include two axes of the X-axis and the Y-axis, it may be constructed to turn only about the X-axis. Even in this case, a coil spring, a cam shaft and a cam ring are replaced, and thus a hinge of an arbitrary rotation specification can be easily obtained.

Although in the above-described hinge apparatus, as a biasing member to bias a cam shaft, a coil spring is employed, it is not limited to this coil spring, but an elastic member such as rubber may be employed. Furthermore, an elastic member such as rubber and a coil spring may be used in combination.

What is claimed is:

1. A hinge apparatus comprising:
   a rotation body; and
   a fixed body configured to support the rotation body rotatably about a rotation axis,
   wherein
   the rotation body includes:
      a base frame having:
         a base body portion extending along the rotation axis; and
         a side portion extending from an end of the base body portion in a direction orthogonal to the rotation axis and formed with a first through hole with the rotation axis as a central axis,
   wherein
   the fixed body includes:
      a bracket having:
         a base portion;
         a first side portion extending from a first edge of the base portion;
         a second side portion extending from a second edge of the base portion;
         a superimposed portion extending from the second side portion sufficiently to overlap with the first side portion;
         a second through hole passing through the first side portion; and
         a third through hole passing through the superimposed portion and communicating with the second through hole; and
      a stud inserted through the first through hole, the second through hole and the third through hole, and secured to the bracket so as to rotatably support the base frame with respect to the bracket, and
   wherein
   the base frame has a contact portion contacting at least one of the first side portion, the superimposed portion and the stud when in a predetermined angular position with respect to the bracket, and
      by the contact, the rotation body is regulated in its rotation with respect to the fixed body.

2. A hinge apparatus comprising:
   a rotation body; and
   a fixed body configured to support the rotation body rotatably about a rotation axis,
   wherein
   the rotation body includes a base frame having:
      a base body portion extending along the rotation axis;
      a side portion extending from an end of the base body portion in a direction orthogonal to the rotation axis and having a first through hole with the rotation axis as a central axis and a cut portion formed by cutting an outer edge of the side portion; and
      a longer side portion having an extending portion and extending from an end of the base body portion outwardly of the base body portion along the rotation axis, the extending portion is engaged with the cut portion and has a protruding portion protruding outward beyond an outer surface of the side portion on a tip end side of the extending portion,
   wherein
   the fixed body includes:
      a bracket having a second through hole; and
      a stud inserted through the first through hole and the second through hole and secured to the bracket so as to rotatably support the base frame with respect to the bracket, and
   wherein
   the protruding portion of the base frame is in contact when at least one of the bracket and the stud establish a predetermined angular position with respect to the bracket, thereby regulating the rotation body in its rotation with respect to the fixed body.

3. A hinge apparatus comprising:
   a rotation body; and
   a fixed body configured to support the rotation body rotatably about a rotation axis,
   wherein
   the rotation body includes a base frame having:
      a base body portion extending along the rotation axis;
      a side portion extending from an end of the base body portion in a direction orthogonal to the rotation axis and having a first through hole with the rotation axis as a central axis and a cut portion formed by cutting an outer edge of the side portion; and
      a longer side portion having an extending portion and extending from an end of the base body portion outwardly of the base body portion along the rotation axis,
      the extending portion is engaged with the cut portion and has a protruding portion protruding outward beyond an outer surface of the side portion on a tip end side of the extending portion,
   wherein
   the fixed body includes:
      a bracket having:
         a base portion;
         a first side portion extending from a first edge of the base portion;
         a second side portion extending from a second edge of the base portion;
         a superimposed portion extending from the second side portion so as to be overlapped with the first side portion;
         a second through hole passing through the first side portion; and
         a third through hole passing through the superimposed portion and communicating with the second through hole; and
      a stud inserted through the first through hole, the second through hole and the third through hole, and secured to the bracket so as to rotatably support the base frame with respect to the bracket, and
   wherein
   the protruding portion of the base frame is in contact when at least one of the first side portion, the superimposed portion and the stud establish a predetermined angular position with respect to the bracket, thereby regulating the rotation body in its rotation with respect to the fixed body.

4. An image displaying apparatus comprising:
   a main body portion;
   an image displaying portion configured to display an image; and a hinge apparatus configured to cause the image displaying portion to turn about at least one axis with respect to the main body portion, wherein the hinge apparatus comprises:
a rotation body; and
a fixed body configured to support the rotation body rotatably about a rotation axis,
the rotation body including:
a base frame having a base body portion extending along the rotation axis; and
a side portion extending from an end of the base body portion in a direction orthogonal to the rotation axis and formed with a first through hole with the rotation axis as a central axis, and the fixed body including:
a bracket having:
a base portion;
a first side portion extending from a first edge of the base portion;
a second side portion extending from a second edge of the base portion;
a superimposed portion extending from the second side portion sufficiently to overlap with the first side portion;
a second through hole passing through the first side portion; and
a third through hole passing through the superimposed portion and communicating with the second through hole; and
a stud inserted through the first through hole, the second through hole and the third through hole, and secured to the bracket so as to rotatably support the base frame with respect to the bracket, and wherein the base frame includes a contact portion contacting at least one of the first side portion, the superimposed portion and the stud in a predetermined angular position with respect to the bracket,
by the contact, the rotation body is regulated in its rotation with respect to the fixed body,
the fixed body is coupled to the main body portion, and
the rotation body is coupled to the image displaying portion.

5. An image displaying apparatus comprising:
a main body portion;
an image displaying portion configured to display an image; and
a hinge apparatus configured to cause the image displaying portion to turn about at least one axis with respect to the main body portion, wherein the hinge apparatus comprises:
a rotation body; and
a fixed body configured to support the rotation body rotatably about a rotation axis;
the rotation body including a base frame having:
a base body portion extending along the rotation axis;
a side portion extending from an end of the base body portion in a direction orthogonal to the rotation axis and having:
a first through hole with the rotation axis as a central axis; and
a cut portion formed by cutting an outer edge of the side portion; and
a longer side portion having an extending portion and extending from an end of the base body portion outwardly of the base body portion along the rotation axis, the extending portion is engaged with the cut portion and has a protruding portion protruding outward beyond the outer surface of the side portion on a tip end side of the extending portion, and
the fixed body including:
a bracket having a second through hole; and
a stud inserted through the first through hole and the second through hole and secured to the bracket so as to rotatably support the base frame with respect to the bracket, and wherein the protruding portion of the base frame is in contact when at least one of the bracket and the stud establish a predetermined angular position with respect to the bracket, thereby regulating the rotation body in its rotation with respect to the fixed body,
the fixed body is coupled to the main body portion, and
the rotation body is coupled to the image displaying portion.

6. An image displaying apparatus comprising:
a main body portion;
an image displaying portion configured to display an image; and
a hinge apparatus configured to cause the image displaying portion to turn about at least one axis with respect to the main body portion, wherein the hinge apparatus comprises:
a rotation body; and
a fixed body configured to support the rotation body rotatably about a rotation axis,
the rotation body including a base frame having:
a base body portion extending along the rotation axis;
a side portion extending from an end of the base body portion in a direction orthogonal to the rotation axis and having:
a first through hole with the rotation axis as a central axis; and
a cut portion formed by cutting an outer edge of the side portion; and
a longer side portion having an extending portion and extending from an end of the base body portion outwardly of the base body portion along the rotation axis, the extending portion engaged with the cut portion and having a protruding portion protruding outward beyond the outer surface of the side portion on a tip end side of the extending portion, and
the fixed body including:
a bracket having:
a base portion;
a first side portion extending from a first edge of the base portion;
a second side portion extending from a second edge of the base portion;
a superimposed portion extending from the second side portion so as to be overlapped with the first side portion;
a second through hole passing through the first side portion; and
a third through hole passing through the superimposed portion and communicating with the second through hole; and
a stud inserted through the first through hole, the second through hole and the third through hole and secured to the bracket so as to rotatably support the base frame with respect to the bracket, and wherein the protruding portion of the base frame is in contact when at least one of the first side portion, the superimposed portion and the stud establish a predetermined angular position with respect to the bracket, thereby regulating the rotation body in its rotation with respect to the fixed body;

the fixed body is coupled to the main body portion; and the rotation body is coupled to the image displaying portion.

7. A hinge apparatus comprising:

a rotation body; and a fixed body configured to support the rotation body rotatably about one rotation axis, wherein the rotation body includes:

a base frame having:

a base body portion extending along the one rotation axis;

a first side portion extending from a first end of the base body portion in a direction orthogonal to the one rotation axis and formed with a first through hole with the one rotation axis as a central axis; and a second side portion extending from a second end of the base body portion in a direction orthogonal to the one rotation axis and formed with a second through hole with the one rotation axis as a center axis;

a first cam body formed with a first cam face at one end thereof, suppresses the rotation about the one rotation axis with respect to the base body portion by engaging the base body portion, the first cam body supported by the base body portion so as to be movable in a direction of the one rotation axis; and a biasing body disposed between the first cam body and the second side portion and biasing the first cam body toward the first side portion, wherein the fixed body includes:

a first shaft inserted in the first through hole of the first side portion and supporting the base frame rotatably about the one rotation axis;

a second shaft inserted in the second through hole of the second side portion and supporting the base frame rotatably about the one rotation axis; and a second cam body formed with a second cam face at one end thereof and supported by the first shaft between the first cam body and the first side portion so that the rotation about the one rotation axis with respect to the first shaft is suppressed, and wherein the first cam face and the second cam face are pressed and contacted with each other by a bias of the biasing body.

8. The hinge apparatus according to claim 7, wherein a distance between tip ends of the first shaft and the second shaft is longer than that of the first cam body in a direction of the one rotation axis.

9. The hinge apparatus according to claim 7, wherein the base body portion of the base frame includes:

a third through hole with the other rotation axis orthogonal to a plane containing the one rotation axis as a central axis;

a third shaft inserted from the outside in the third through hole;

a shaft fixing portion fixed to a tip end of the third shaft having been inserted, sandwiching the base body portion between the shaft fixing portion and the third shaft, and rotating about the other rotation axis with respect to the base frame; and a concave portion provided at the side portion of the first cam body, and wherein the shaft fixing portion comes in the concave portion.

10. An image displaying apparatus comprising:

a main body portion;

an image displaying portion configured to display an image; and a hinge apparatus configured to cause the image displaying portion to turn about at least one axis with respect to the main body portion, wherein the hinge apparatus comprises:

a rotation body; and a fixed body configured to support the rotation body rotatably about one rotation axis, the rotation body including:

a base frame having:

a base body portion extending along the one rotation axis;

a first side portion extending from a first end of the base body portion in a direction orthogonal to the one rotation axis and formed with a first through hole with the one rotation axis as a central axis; and a second side portion extending from a second end of the base body portion in a direction orthogonal to the one rotation axis and formed with a second through hole with the one rotation axis as a center axis;

a first cam body, formed with a first cam face at one end of the first cam body, suppresses the rotation about the one rotation axis with respect to the base body portion by engaging the base body portion, the first cam body supported by the base body portion so as to be movable in a direction of the one rotation axis; and a biasing body disposed between the first cam body and the second side portion and biasing the first cam body toward the first side portion; and the fixed body including:

a first shaft inserted in the first through hole of the first side portion and supporting the base frame rotatably about the one rotation axis;

a second shaft inserted in the second through hole of the second side portion and supporting the base frame rotatably about the one rotation axis; and a second cam body formed with a second cam face at one end of the second cam body and supported by the first shaft between the first cam body and the first side portion so that the rotation about the one rotation axis with respect to the first shaft is suppressed, and wherein the first cam face and the second cam face are pressed and contacted with each other by a bias of the biasing body, the fixed body is coupled to the main body portion, and the rotation body is coupled to the image displaying portion.

11. An image displaying apparatus comprising:

a main body portion;

an image displaying portion configured to display an image; and a hinge apparatus configured to cause the image displaying portion to turn about at least one axis with respect to the main body portion, wherein the hinge apparatus comprises:

a rotation body; and a fixed body configured to support the rotation body rotatably about one rotation axis, the rotation body including:

a base frame having:

a base body portion extending along the one rotation axis;

a first side portion extending from a first end of the base body portion in a direction orthogonal to the one rotation axis and formed with a first through hole with the one rotation axis as a central axis; and a second side portion extending form a second end of the base body portion in a direction orthogonal to the one rotation axis and formed with a second through hole with the one rotation axis as a center axis;

a first cam body formed with a first cam face at one end of the first cam body, suppresses the rotation about the one rotation axis with respect to the base body portion by engaging the base body portion, the first cam body supported by the base body portion so as to be movable in a direction of the one rotation axis; and a biasing body disposed between the first cam body and the second side portion and biasing the first cam body toward the first side portion, and the fixed body including:

a first shaft inserted in the first through hole of the first side portion and supporting the base frame rotatably about the one rotation axis;

a second shaft inserted in the second through hole of the second side portion and supporting the base frame rotatably about the one rotation axis; and a second cam body formed with a second cam face at one end of the second cam body and supported by the first shaft between the first cam body and the first side portion so that the rotation about the one rotation axis with respect to the first shaft is suppressed, and the first cam face and the second cam face are pressed and contacted with each other by a bias of the biasing body, wherein the base body portion of the base frame includes:

a third through hole with the other rotation axis orthogonal to a plane containing the one rotation axis as a central axis;

a third shaft inserted from the outside in the third through hole;

a shaft fixing portion fixed to a tip end of the third shaft having been inserted, sandwiching the base body portion between the shaft fixing portion and the third shaft, and rotating about the other rotation axis with respect to the base frame; and a concave portion provided at the side portion of the first cam body, and wherein the shaft fixing portion comes in the concave portion, the fixed body is coupled to the main body portion, and the third shaft is coupled to the image displaying portion.

* * * * *